US010047533B2

(12) United States Patent
Nakagawa et al.

(10) Patent No.: US 10,047,533 B2
(45) Date of Patent: Aug. 14, 2018

(54) WIRE REEL, REINFORCING BAR BINDING MACHINE, AND ROTATIONAL INFORMATION DETECTING METHOD

(71) Applicant: MAX CO., LTD., Tokyo (JP)

(72) Inventors: Yasushi Nakagawa, Tokyo (JP); Kouji Katou, Tokyo (JP); Tsuyoshi Kobayashi, Tokyo (JP); Yu Yamamoto, Tokyo (JP)

(73) Assignee: MAX CO., LTD., Tokyo (JP)

( * ) Notice: Subject to any disclaimer, the term of this patent is extended or adjusted under 35 U.S.C. 154(b) by 0 days.

(21) Appl. No.: 15/412,732

(22) Filed: Jan. 23, 2017

(65) Prior Publication Data

US 2017/0130472 A1    May 11, 2017

Related U.S. Application Data

(63) Continuation of application No. 12/465,959, filed on May 14, 2009, now Pat. No. 9,630,802.

(30) Foreign Application Priority Data

May 19, 2008  (JP) .................................. 2008-130638
Jan. 23, 2009  (JP) .................................. 2009-012845

(51) Int. Cl.
*E04G 21/12*    (2006.01)
*B65H 75/14*    (2006.01)
(Continued)

(52) U.S. Cl.
CPC ............ *E04G 21/123* (2013.01); *B21F 15/04* (2013.01); *B65H 49/18* (2013.01); *B65H 51/30* (2013.01);
(Continued)

(58) Field of Classification Search
CPC .... B65H 2701/52; B65H 49/18; B65H 49/20; B65H 51/30; B65H 75/00; B65H 75/02;
(Continued)

(56) References Cited

U.S. PATENT DOCUMENTS

| | | |
|---|---|---|
| 2,708,892 A | 5/1955 | Ayres |
| 4,685,493 A | 8/1987 | Yuguchi |

(Continued)

FOREIGN PATENT DOCUMENTS

| | | |
|---|---|---|
| CN | 1129431 A | 8/1996 |
| CN | 1561269 A | 1/2005 |

(Continued)

OTHER PUBLICATIONS

A Canadian Office Action dated May 29, 2015 that issued in corresponding Canadian Patent Application No. 2,665,021.

(Continued)

*Primary Examiner* — R. K. Arundale
*Assistant Examiner* — Pradeep C Battula
(74) *Attorney, Agent, or Firm* — Drinker Biddle & Reath LLP

(57) ABSTRACT

A wire reel is detachably provided in a housing chamber of a binding machine body which binds a reinforcing bar. The wire reel includes a cylindrical hub portion which winds a wire, and a pair of parallel flanges overhanging outward from both external peripheral ends of the hub portions. A side wall inside the hub portion is formed of light-transmitting portions which allow the light from a transmissive photosensor provided in the binding machine body to be transmitted therethrough.

2 Claims, 32 Drawing Sheets

(51) Int. Cl.
  *B65H 49/18* (2006.01)
  *B21F 15/04* (2006.01)
  *B65H 51/30* (2006.01)
  *G01D 5/347* (2006.01)

(52) U.S. Cl.
  CPC ........... *B65H 75/14* (2013.01); *G01D 5/3473* (2013.01); *B65H 2701/362* (2013.01); *B65H 2701/52* (2013.01)

(58) Field of Classification Search
  CPC ....... B65H 75/14; B65B 13/00; B65B 13/025; E04G 21/123; G01D 5/3473
  See application file for complete search history.

(56) References Cited

U.S. PATENT DOCUMENTS

| | | | |
|---|---|---|---|
| 5,582,355 | A | 12/1996 | Nakamura et al. |
| 5,682,927 | A | 11/1997 | Takahashi et al. |
| 5,944,064 | A | 8/1999 | Saito et al. |
| 7,204,276 | B2 * | 4/2007 | Nakagawa ............. B65H 49/20 140/119 |
| 7,798,180 | B2 | 9/2010 | Kazuaki et al. |
| 9,415,970 | B2 | 8/2016 | Nakagawa et al. |
| 2005/0061389 | A1 | 3/2005 | Nakagawa et al. |
| 2005/0077413 | A1 | 4/2005 | Nakagawa et al. |
| 2005/0199790 | A1 | 9/2005 | Sheu et al. |
| 2006/0283516 | A1 | 12/2006 | Nagaoka et al. |
| 2007/0199610 | A1 | 8/2007 | Itagaki |
| 2007/0227613 | A1 | 10/2007 | Matsuoka et al. |
| 2009/0090801 | A1 | 4/2009 | Schnakenbeck |
| 2009/0126824 | A1 | 5/2009 | Nakagawa et al. |
| 2009/0283167 | A1 | 11/2009 | Nakagawa et al. |
| 2014/0091171 | A1 | 4/2014 | Nakagawa et al. |

FOREIGN PATENT DOCUMENTS

| | | |
|---|---|---|
| CN | 1561271 A | 1/2005 |
| CN | 1969101 A | 5/2007 |
| CN | 1985058 A | 6/2007 |
| EP | 1430971 A1 | 6/2004 |
| EP | 1 439 015 A1 | 7/2004 |
| EP | 1 612 348 A1 | 1/2006 |
| FR | 2 577 594 | 8/1986 |
| GB | 000369500 A | 3/1932 |
| JP | 2003-175905 | 6/2003 |
| JP | A-2003-175905 | 6/2003 |
| JP | 2004-27765 | 1/2004 |
| JP | 2004-59017 | 2/2004 |
| JP | 3598784 B2 | 12/2004 |
| JP | 2005-194847 | 7/2005 |
| JP | A-2010-001727 | 1/2010 |
| SU | 543442 A1 | 1/1977 |
| TW | 312672 B | 8/1997 |
| WO | WO 2004021368 A1 | 3/2004 |

OTHER PUBLICATIONS

A European Office Action dated Aug. 21, 2015 from corresponding European Application No. 09005936.1 (6 pages).
A Canadian Office Action dated Jan. 19, 2016 that issued in corresponding Canadian Patent Application No. 2,665,021.
Extended European Search Report dated Nov. 5, 2014 in corresponding European Patent Application No. 09 00 5936.
Office Action dated Mar. 23, 2016 from corresponding European Patent Application No. 09005936.1 (6 pages).
Office Action dated Nov. 9, 2016 from corresponding European Patent Application No. 09005936.1 (5 pages).

* cited by examiner

FIG.23

| DETECTION PATTERN | START POSITION | STOP POSITION |
|---|---|---|
| *1 | A | D |
|  | B | D |
| *2 | A | C |
|  | B | C |
| *3 | D | C |
|  | D | D |

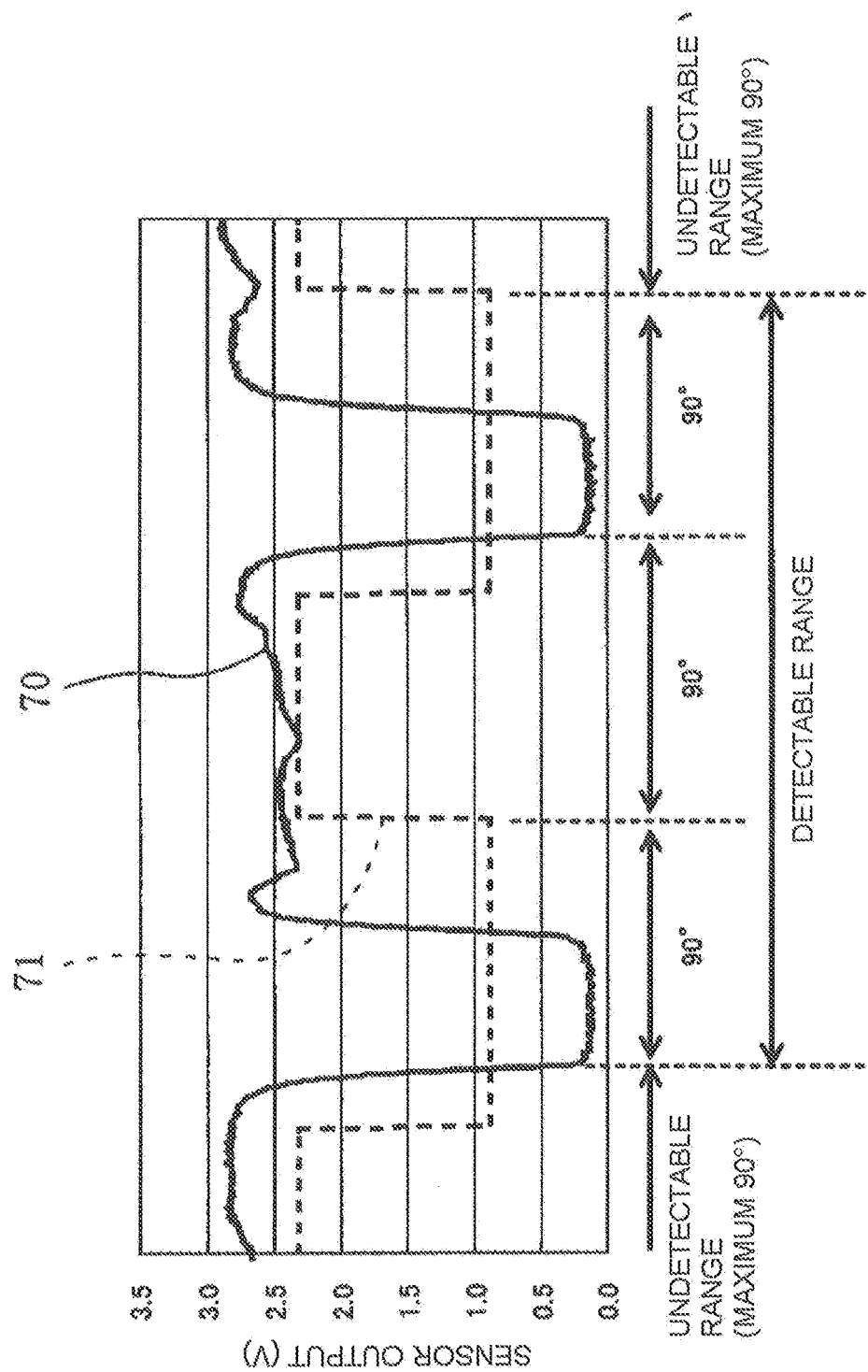

WIRE REEL, REINFORCING BAR BINDING MACHINE, AND ROTATIONAL INFORMATION DETECTING METHOD

This is a continuation application of copending application Ser. No. 12/465,959, filed on May 14, 2009, which is incorporated by reference herein in its entirety.

BACKGROUND OF THE INVENTION

Field of the Invention

The present invention relates to a reinforcing bar binding machine which feeds a wire of a wire reel, winds the wire around a reinforcing bar in a loop shape, and then twists and binds the wire, a wire real attached to a reinforcing bar binding machine body and having information display means of the type or the like of a wire reel, and a rotational information detecting method which detects the rotational information from an information detection region of the wire reel.

Background Art

In a conventional reinforcing bar binding machine, a wire reel around which a wire is wound is held at a rear portion of the binding machine, the wire is on pulled out by feed gears of a wire feeding device from the wire reel and delivered forward when a switch is turned on and a trigger is operated, the wire is supplied in a loop shape from a curved portion of the tip of a guide arm and wound around a reinforcing bar, and then, a portion of the loop is held, and twisted, and turned by a twisting hook, thereby binding the reinforcing bar. As one which automatically adjusts torsion torque of the wire of the reinforcing bar binding machine, there is a device in which a side surface of the wire reel is provided with a display means which displays the type of a wire, the display means is detected by a detecting means provided in the reinforcing bar binding machine, the type of the wire is determined on the basis of a result detected by the detecting means, and the torsion torque is automatically adjusted (for example, JP-A-2005-194847).

By providing a portion of the wire reel in a convex shape, and detecting this convex shape by a contact type sensor provided in the binding machine body, this device performs detection of absolute rotation of the wire reel. Moreover, aside from this, a portion of a black recess formed at a side surface of the wire reel is provided with white projections, and rotation detection by a reflective photosensor provided in the binding machine body is also performed. By setting the interval of signal by two sensors to 90°, the number of the white projections per one rotation of the wire reel is detected, and feed/torsion control suitable for the wire diameter/wire type of consumable goods is made.

However, there are the following problems in the detection by the reflective photosensor.

1) The bottom surface of the black recess of the wire reel is not a flat. Some stepped portions are formed. Accordingly, in a case where the white projections are detected by the reflective photosensor, all height differences within the recess as well as the white projections may be detected due to characteristics of the photosensor. Accordingly, as shown by a line 70 in FIG. 28, erroneous detection occurs since output signals by the photosensor change and a voltage is not returned, and erroneous detection easily occurs even by attachment of sand or dust.

2) There is a variation in the sensitivity of the photosensor, and while this is taken into consideration, the area of the white projections should be increased in order to switch on/off of the sensor reliably. For this reason, the shape of the wire reel is also largely restricted, and it is difficult to increase resolution. Additionally, since the number of white projections is also restricted, various kinds of information cannot be given.

3) In the conventional sensor, as shown by a line 71 in FIG. 28, the signal interval becomes 90°. Therefore, the ranges where rotation cannot be detected immediately after start of rotation of the wire reel and immediately before stop of rotation thereof are respectively 90°. Therefore, the error of rotation detection of 180° at the maximum per 1 binding occurs. This error becomes the detection error of feed amount of about 50 mm oven at the last stage of rotation of the wire reel where an exact wire feed amount can be detected. Meanwhile, when the feed amount becomes 40 mm shorter than a predetermined feed amount, twist off at the time of binding easily occurs. Accordingly, when correction of the feed amount is performed from the rotational amount of the wire reel, only the resolution at which a decrease in the feed amount of at least 40 mm is detected is required. Accordingly, by the existing sensor, precise detection of rotation of the wire reel at the time of wire feed cannot be performed, and a decrease in wire feed amount caused by wear of the feed gears cannot be detected.

SUMMARY OF THE INVENTION

A first object of the invention is to provide a reinforcing bar binding machine capable of detecting the type of a wire or the feed amount of the wire by using the wire reel.

Additionally, a second object of the invention is to provide a wire reel for a reinforcing bar binding machine capable of eliminating erroneous detection based on a height difference or the like, capable of receiving sufficient light by a light-receiving element even if the transmission of light is small, and capable of improving the resolution of a sensor.

Moreover, a third object of the invention is to provide a method of detecting rotational information, such as the rotational amount of the wire reel or the type of a wire.

In order to achieve the above first object, according to one or more embodiments of the invention, a reinforcing bar binding machine 1 is provided with: a binding machine body 2; a housing chamber 3 provided in the binding machine body 2; a wire reel 4 mounted in the housing chamber 3; a transmissive photosensor 26 having a light-emitting element 27 on one of both side walls 23, 24 of the housing chamber 3 and a light-receiving element 28 on the other of both side walls 23, 24; a plurality of light-transmitting portions 64, 64a, 64b, 64c, 64d, 64e formed on the wire reel 4 and for transmitting light emitted from the light-emitting element 27; and a control circuit 100 for determining rotational information of the wire reel 4 according to a number of the light-transmitting portions 64, 64a, 64b, 64c, 64d, 64e detected by the photosensor 26 during rotation of the wire reel 4.

In the above configuration, a transmissive photosensor having a light-transmitting element on one of both side walls of the housing chamber of the reinforcing bar binding machine and a light-receiving element on the other side wall is provided, the wire reel is formed with a plurality of light-transmitting portions which allow the light emitted from the light-emitting element to be transmitted therethrough, and a control circuit is provided to determine the rotational information of the wire reel according to the number of the light-transmitting portions detected by the photosensor during rotation of the wire reel. Thus, since the light generated in the light-emitting element and transmitted through the light-transmitting portions provided in the wire reel are detected by the light-receiving element, detection is allowed without being influenced by irregularity on the surface of the wire reel, and the detection accuracy of rotational information improves.

Additionally, since the light generated in the light-emitting element is directly detected by the light-receiving element, a sufficient quantity of light can be received by the light-receiving element even if a detection portion is smaller compared with a reflective photosensor, and the resolution of the sensor can be improved.

Moreover, as the resolution of the sensor improves, the accuracy of detection of the feed amount of a wire converted from the rotational amount of the reel also improves, and a decrease in the wire feed amount can be detected.

In the reinforcing bar binding machine, the wire reel 4 may include a plurality of information detection regions S1, S2 to be detected by the transmissive photosensor 26, and a number of the light-transmitting portions 64, 64a, 64b, 64c, 64d, 64e provided on one of the information detection regions S1, S2 may be different with a number of the light-transmitting portions 64, 64a, 64b, 64c, 64d, 64e provided on another of the information detection regions S1, S2.

In the above configuration, the wire reel is provided with an information detection region where detection is performed by the transmissive photosensor, and the information detection region is split into two or more information detection regions, and the light-transmitting portions are formed in the two or more information detection regions by numbers different from each other. Therefore, two kinds or more of rotational information can be detected according to the number of the light-transmitting portions only by rotating the wire reel.

In the reinforcing bar binding machine, a distance between one of the light-emitting element 27 and the light-receiving element 28 and an axial center P of the wire reel 4 may be smaller than a distance between the other of the light-emitting element 27 and the light-receiving element 28 and the axial center P of the wire reel 4.

In the above configuration, one of the light-emitting element and the light-receiving element is arranged nearer to the axial center of the wire reel than the other element. Therefore, it is not necessary to necessarily provide the optical axis from the light-emitting element parallel to the axial center of the wire reel. Thus, the degree of freedom of design increases.

In order to achieve the above second object, according to one of more embodiments of the invention, a wire reel 4 is provided with: a cylindrical hub portion 43 on which a wire is wound; a pair of parallel flanges 44, 45 overhanging outward from both radially outer ends of axial ends of the hub portion 43; a side wall 60 that is provided radially inside of the hub portion 43 and intersects with an axial direction of the wire reel; and a plurality of light-transmitting portions 64, 64a, 64b, 64c, 64d, 64e provided on the side wall 60.

In the above configuration, the wire reel detachably provided in a housing chamber of a binding machine body which binds a reinforcing bar. The wire reel includes a cylindrical hub portion which winds a wire, and a pair of parallel flanges overhanging outward from both external peripheral ends of the hub portions. A side wall inside the hub portion is used as an information detection region, and the information detection region is formed of a plurality of light-transmitting portions which allow the light from a transmissive photosensor provided in the binding machine body to be transmitted therethrough. Therefore, rotational information having different meanings, such as information as a measure which detects the rotational amount of the reel according to the array of the light-transmitting portions, and information for identifying the type of a reel can be given.

In the wire reel, each of the light-transmitting portions 64, 64a, 64b, 64c, 64d, 64e may have a cross-section parallel to the axial direction in which one side in the axial direction is narrower than the other side in the axial direction. Moreover, each of the light-transmitting portions (64, 64a, 64b, 64c, 64d, 64e) may have an opening in one side in the axial direction and an opening in the other side in the axial direction, and an area of the opening in the one side is smaller than an area of the opening in the other side.

In the above configuration, the cross-section of the light-transmitting portions is formed so as to become narrower on the side of the light-emitting element of the transmissive photosensor and become wider on the side of the light-receiving element. Therefore, since the light from the light-emitting element is hardly reflected by the inner surfaces of the light-transmitting portions, and light which has transmitted through the light-transmitting portions reaches the light-receiving element without spreading so much, erroneous detection hardly occurs.

In the wire reel, a distance from the side wall 60 to one of said axial ends of the hub portion 43 in said one side in the axial direction may be longer than a distance from the side wall 60 to the other of said axial ends of the hub portion 43 in said the other side in the axial direction.

In the wire reel, each of the light-transmitting portions 64, 64a, 64b, 64c, 64d, 64e may have a silt-like long hole shape which is long in a radial direction.

In the above configuration, the light-transmitting portions are formed as slit-like long holes which are long in the radial direction of the wire reel. Therefore, detection is allowed even if the axes of the light-receiving element and the light-emitting element are shaken due to vibration or the like during operation, and do not completely coincide with each other. Particularly, it is possible to effectively cope with radial deviation of an optical axis which is directed to the light-receiving element from the light-emitting element.

Moreover, the light-emitting element and the light-receiving element cannot help being arranged in the position where the optical axis deviates from the axial center of the wire reel, and does not become parallel, due to constraints on attachment. Additionally, there is a possibility that the optical axis of the light emitted from the light-emitting element may deviate in the rotational direction or the radial direction of the wire reel even during the rotation of the wire reel. However, since the transmission portions which allow the light emitted from the light-emitting element to be transmitted therethrough are formed in a slit shape which is long in the radial direction of the wire reel, it is possible to cope with radial deviation of the optical axis which is directed to the light-receiving element from the light-emitting element.

In the wire reel, each of the light-transmitting portions 64, 64a, 64b, 64c, 64d, 64e may be formed by plugging up each opening 72 formed in the wire reel 4 with a light-transmitting material 73.

In the above configuration, the light-transmitting portions are formed by plugging up openings formed in the wire reel with a light-transmitting material. Therefore, the inside of the wire reel can be protected, and the whole strength does not degrade so much.

The wire reel may further include an inner tube 40 coaxially formed axially inside of the hub portion 43, wherein the side wall 60 is formed between the hub portion 43 and the inner tube 40.

In the wire reel, the wire real may be mountable to a housing chamber 3 of a binding machine body 2 of a reinforcing bar binding machine 1. The light-transmitting portions 64, 64a, 64b, 64c, 64d, 64e may transit light emitted from a light-emitting element 27 of a transmissive photosensor 26 provided on the binding machine body 2, when the wire reel 4 is mounted to the housing chamber 3. Each of the light-transmitting portions 64, 64a, 64b, 64c, 64d, 64e may have a cross-section parallel to the axial direction in which a side of the light-emitting element 27 is narrower than a side of the light-receiving element 28. A gap may be provided between each of the light-transmitting portions 64, 64a, 64b, 64c, 64d, 64e and an outside surface of the inner tube 40 to such an extent that light from the light-emitting element 27 is prevented from being reflected by the outside surface of the inner tube 40 and being transmitted through the light-transmitting portions 64, 64a, 64b, 64c, 64d, 64e.

In the above configuration, inner tube is coaxially formed inside the hub portion, the side wall is formed between the hub portion and the inner tube, a gap is provided between the light-transmitting portions and the outside surface of the inner tube to such an extent that the light from the light-emitting element is prevented from being reflected by the outside surface of the inner tube and being transmitted through the light-transmitting portions. Therefore, even if the light from the light-emitting element is reflected by the outside surface of the inner tube, the light hardly enter the light-transmitting portions, and erroneous detection can be prevented effectively.

In the wire reel, each of the light-transmitting portions 64b may be formed so as to extend toward an outer peripheral edge of the wire reel 4 from a transmission portion 71 through which light is transmitted from the light-emitting element 27 toward the light-receiving element 28.

In the above configuration, the light-transmitting portions are formed so as to extend toward an outer peripheral edge of the wire reel from transmission portions through which light is transmitted from the light-emitting element toward the light-receiving element. Therefore, the light-transmitting portions may be formed as holes. Additionally, the light-transmitting portions may not be formed straight.

In the wire reel, each of the light-transmitting portions 64c may be formed so as to extend toward an axial center of the wire reel from a transmission portion 71 through which light is transmitted from the light-emitting element 27 toward the light-receiving element 28.

In the above configuration, the light-transmitting portions are formed so as to extend toward the axial center of the wire reel from the transmission portion. Therefore, the light-transmitting portions may be formed as holes.

In the wire reel, the light-transmitting portions 64e may be continuous in portions excluding transmission portions 71 through which light is transmitted from the light-emitting element 27 toward the light-receiving element 28.

In the above configuration, the light-transmitting portions are continuous in portions excluding the transmission portions. Therefore, the light-transmitting portions may be apparently seen as one light-transmitting portion.

In order to achieve above third object, according to one or more embodiments of the invention, a rotational information in a reinforcing bar binding machine is detected by the method of: providing two information detection regions S1, S2 by a photosensor 26 arranged in a binding machine body 2 on a wire reel 4 mountable to the binding machine body 2 of the reinforcing bar binding machine 1; providing light-transmitting portions 64, 64a, 64b, 64c, 64d, 64e on one of the information detection regions S1, S2 in different numbers from the other information detection regions; providing, on the binding machine body 2, a detecting means 32 which is capable of detecting ends of the two information detection regions S1, S2; using a signal detected by the detecting means 32 as a timing signal for wire reel rotation; determining in which information detection region S1, S2 had been detected according to the number of the light-transmitting portions detected between two timing signals; when it is determined that a rotational frequency information detection region S1 is detected, determining a start position of the rotation of the wire reel according to which light-transmitting portion had been detected by the photosensor 26 after the detecting means 32 detects the timing signals at the time of start of the rotation of the wire reel; determining a rotation stop position of the wire reel according to which light-transmitting portion had been detected by the photosensor 26 after the detecting means detects 32 a final timing signal at the time of stop of the rotation of the wire reel; and when the wire reel has approached a last stage of rotation, converting a feed amount of a wire on the basis of the rotational amount of the wire reel between the rotation start position and the rotation stop position.

In the above configuration, a wire reel detachably provided in a binding machine body which binds a reinforcing bar is provided with an information detection region by a photosensor arranged in the binding machine body, the information detection region is split into two information detection regions of a wire reel type information detection region, and a rotational frequency information detection region, and the reinforcing bar binding machine body, which is mounted with wire reels in which light-transmitting portions are formed by mutually different numbers, is provided with a detecting means capable of detecting ends of the two information detection regions. A signal detected by the detecting means is used as a timing signal for wire reel rotation, and it is determined in which information detection region a wire reel exists according to the number of the light-transmitting portions detected between two timing signals. When it is determined that the wire reel is in the rotational frequency information detection region, a start position of the rotation of the wire reel is determined according to what number light-transmitting portion the photosensor has detected after the detecting means detects the timing signals at the time of start of the rotation of the wire reel, and a rotation stop position of the wire reel is determined according to what number light-transmitting portion the photosensor has detected after the detecting means detects a final timing signal at the time of stop of the rotation of the wire reel. When the wire reel has approached a last stage of rotation, the feed amount of a wire is converted on the basis of the rotational amount of the wire reel between the rotation start position and the rotation stop position. Therefore, the feed amount of the wire detected from the feed means of the wire is compared with the feed amount of the wire converted from the rotational amount of the wire reel, and when the feed amount of the wire converted from the rotational amount of the feed gears is smaller than the feed amount of the wire converted from the rotational amount of the wire reel, the wire is fed excessively by the difference therebetween. Thereby, when feed accuracy has been reduced in the wire feed means, the control of correcting the feed amount is allowed by detecting the reduction.

Moreover, according to one or more embodiments of the invention, a rotational information in a reinforcing bar binding machine is detected by the method of: providing two information detection regions S1, S2 by a photosensor 26 arranged in a binding machine body 2 on a wire reel 4 mountable to the binding machine body 2 of the reinforcing bar binding machine 1; providing light-transmitting portions 64, 64a, 64b, 64c, 64d, 64e on one of the information detection regions S1, S2 in different numbers from the other information detection regions; providing, on the binding machine body 2, a detecting means 32 which is capable of detecting ends of the two information detection regions S1, S2; using a signal detected by the detecting means 32 as a timing signal for wire reel rotation; determining in which information detection region S1, S2 had been detected according to the number of the light-transmitting portions detected between two timing signals; and when it is determined a wire reel type information detection region S2 is detected, determining a type of a wire reel according to the number of the light-transmitting portions in the wire reel type information detection region S2.

In the above configuration, a wire reel detachable provided in a binding machine body which binds a reinforcing bar is provided with an information detection region by a photosensor arranged in the binding machine body, the information detection region is split into two information detection regions of a wire reel type information detection region and a rotational frequency information detection region, and the reinforcing bar binding machine body, which is mounted with wire reels in which light-transmitting portions are formed by mutually different numbers, is provided with a detecting means capable of detecting ends of the two information detection regions. A signal detected by the detecting means is used as a timing signal for wire reel rotation, and it is determined in which information detection region a wire reel exists according to the number of the light-transmitting portions detected between two timing signals. When it is determined that the wire reel is in the wire reel type information detection region, the type of a wire reel is determined according to the number of the light-transmitting portions in the wire reel type information detection region. Therefore, according to the type of the wire reel, it is possible to set the feed amount of a wire by the wire feed means instantaneously, or to set torsion torque or the like of a wire by the supply power of an electric motor.

Other aspects and advantages of the invention will be apparent from the following description, the drawings and the claims.

BRIEF DESCRIPTION OF THE DRAWINGS

FIG. 23 is a chart showing a range where the start and end of rotation can be detected.

FIG. 28 is a chart showing the output waveform of a conventional sensor.

REFERENCE NUMERALS

Figure 1:
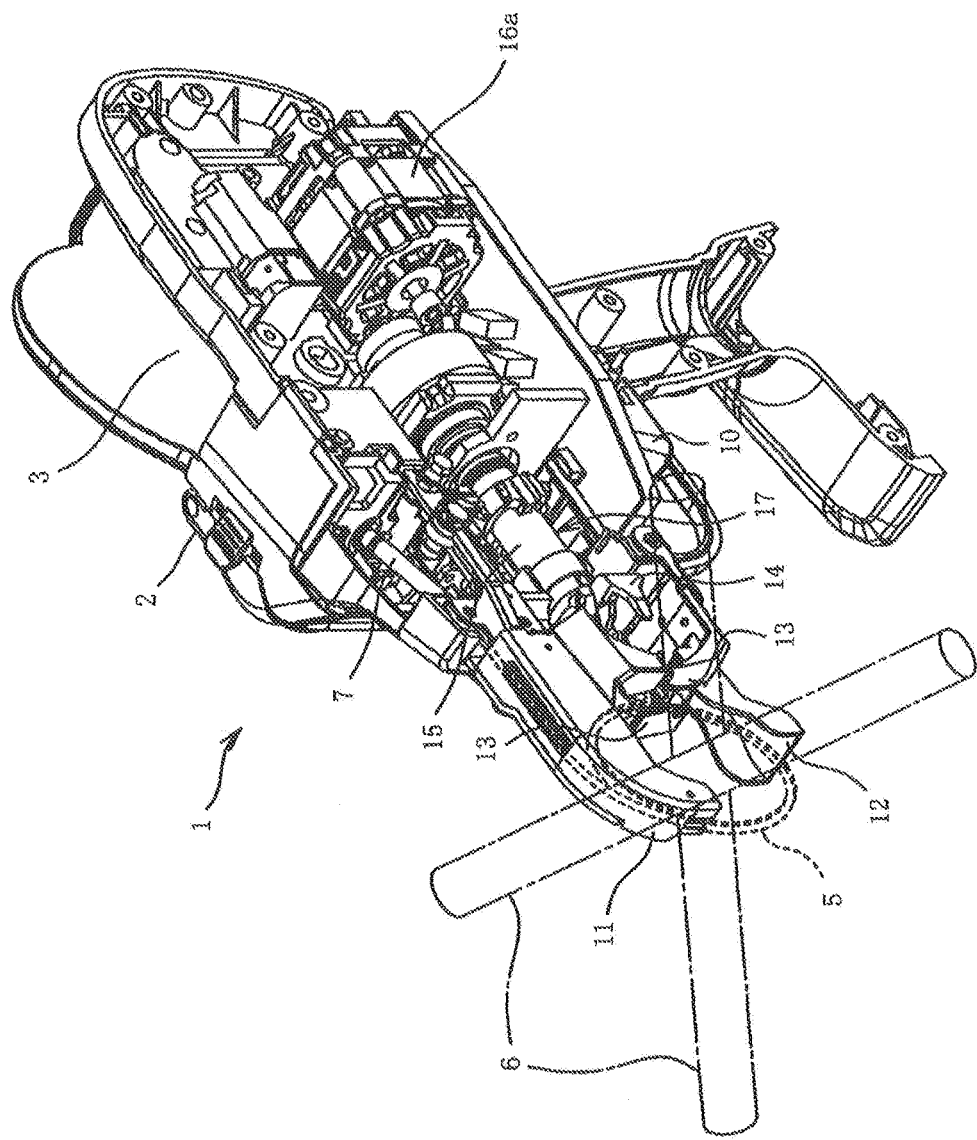
FIG. 1 is a perspective view of the outline of a reinforcing bar binding machine according to an exemplary embodiment of the invention from which a one-side cover is removed.
Figure 2:
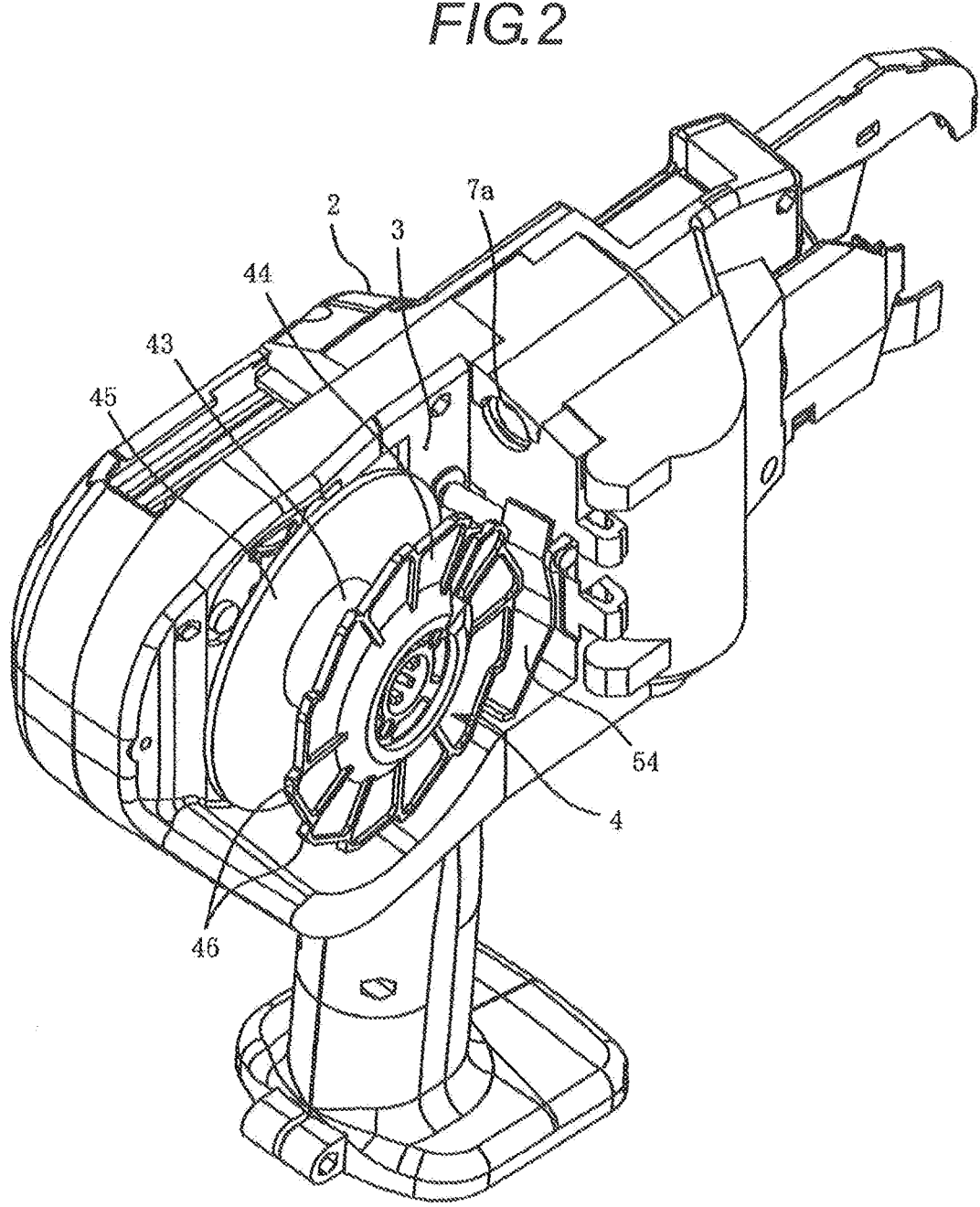
FIG. 2 is a perspective view when the reinforcing bar binding machine is seen from the rear.
Figure 3:
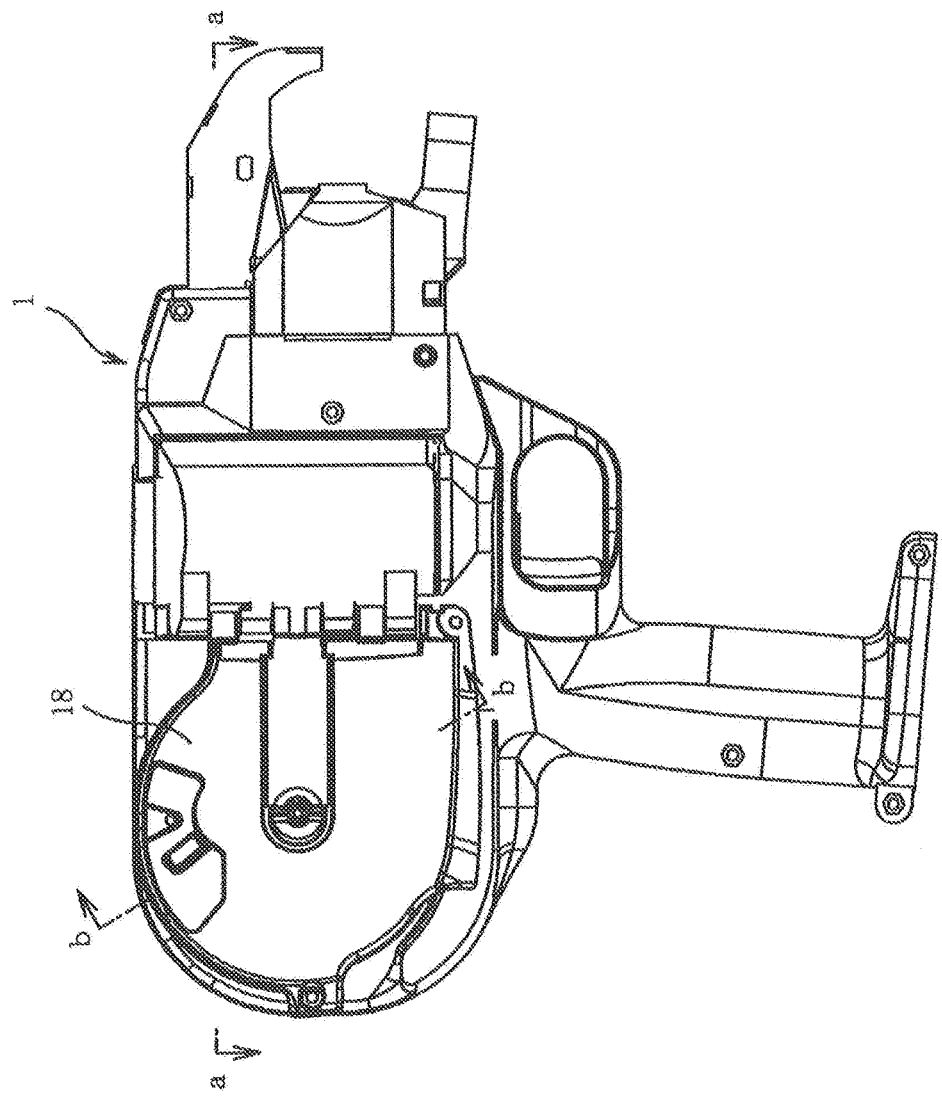
FIG. 3 is a side view in a state where a wall member of the reinforcing bar binding machine is removed.

1: REINFORCING BAR BINDING MACHINE
2: BINDING MACHINE BODY
3: STORAGE CHAMBER
4: WIRE REEL
26: TRANSMISSIVE PHOTOSENSOR
27: LIGHT-TRANSMITTING ELEMENT
28: LIGHT-RECEIVING ELEMENT
48: HUB PORTION
44, 45: FLANGE
64, 64a, 64b, 64c, 64d, 64e: LIGHT-TRANSMITTING PORTION

DETAILED DESCRIPTION OF THE EXEMPLARY EMBODIMENTS

An exemplary embodiment of the invention is described in reference with drawings.

In FIGS. 1 to 4, reference numeral 1 represents a reinforcing bar binding machine. The reinforcing bar binding machine 1 mounts a wire reel 4 around which a wire 5 for binding of a reinforcing bar is wound on a housing chamber 3 provided in a binding machine body 2, delivers the wire 5 while rotating the wire 5, and winds and then twists the wire 5 around a reinforcing bar 6, thereby binding the reinforcing bar 6.

The binding machine body 2 is provided with a guide pipe 7 which allows the wire 5 pulled out from the wire reel 4 to pass therethrough. One end 7a of the guide pipe 7 is opened to the housing chamber 3, and the other end thereof is located in front of a guide portion 11 which will be described later. A pair of feed gears 8 as a feeding means of the wire 5 is disposed in an intermediate portion of the guide pipe 7. The wire 5 is sandwiched by feed rollers formed integrally with the feed gears 8, and the wire 5 is delivered forward by an electric meter (not shown).

When a switch is turned on by a trigger 10, the electric motor rotates, and the wire feed gears 8 rotate. Then, the wire 5 wound around the wire reel 4 stored in the housing chamber 3 is fed ahead of the binding machine body 2 through the guide pipe 7 by the rotation of the wire feed gears 8.

A guide portion 11 which gives a curling habit is formed at the tip of the guide pipe 7 so that the wire 5 fed into the binding machine body 2 goes out in a curled shape. The tip of the guide portion 11 is curved in a circular-arc shape. Here, the wire is given a curling habit, and is wound around the reinforcing bar 6 between the guide portion 11 and the lower guides 12.

Additionally, a wire cutting means (not shown) is disposed at the guide portion 11. When the feed amount of the wire 5 reaches a predetermined amount, the wire cutting means is configured so as to out the wire 5.

A pair of patch plate portions 13 patched to the reinforcing bar 6 is formed at a lower portion of a front end of the binding machine body 2 directed to the reinforcing bar 6, and a wire twisting device 17 which has a twisting book 14 provided at a tip portion thereof between the pair of patch plate portions 13.

The wire twisting device 17 makes the sleeve 15 on which a hook 14 pivots openably and closably move forward by an electric motor 16a to operate to close the hook 14, thereby gripping the wire 5 wound in a loop shape around the reinforcing bar 6 engaged with the patch plate portions 13, and then makes the hook 14 rotate along with the sleeve 15, thereby twisting the wire 5 to bind the reinforcing bar 6. Thereafter, the wire twisting device makes the hook 14 rotate reversely and makes the sleeve 15 move back, thereby separating the sleeve 15 from the wire 5, and returning the sleeve 15 to its initial position. In addition, when the wire twisting device 17 operates, the sleeve 15 which has moved forward drives the wire cutting means during its movement, and thereby, the wire is cut. Immediately after that, twisting of the wire 5 is performed.

Figure 4:
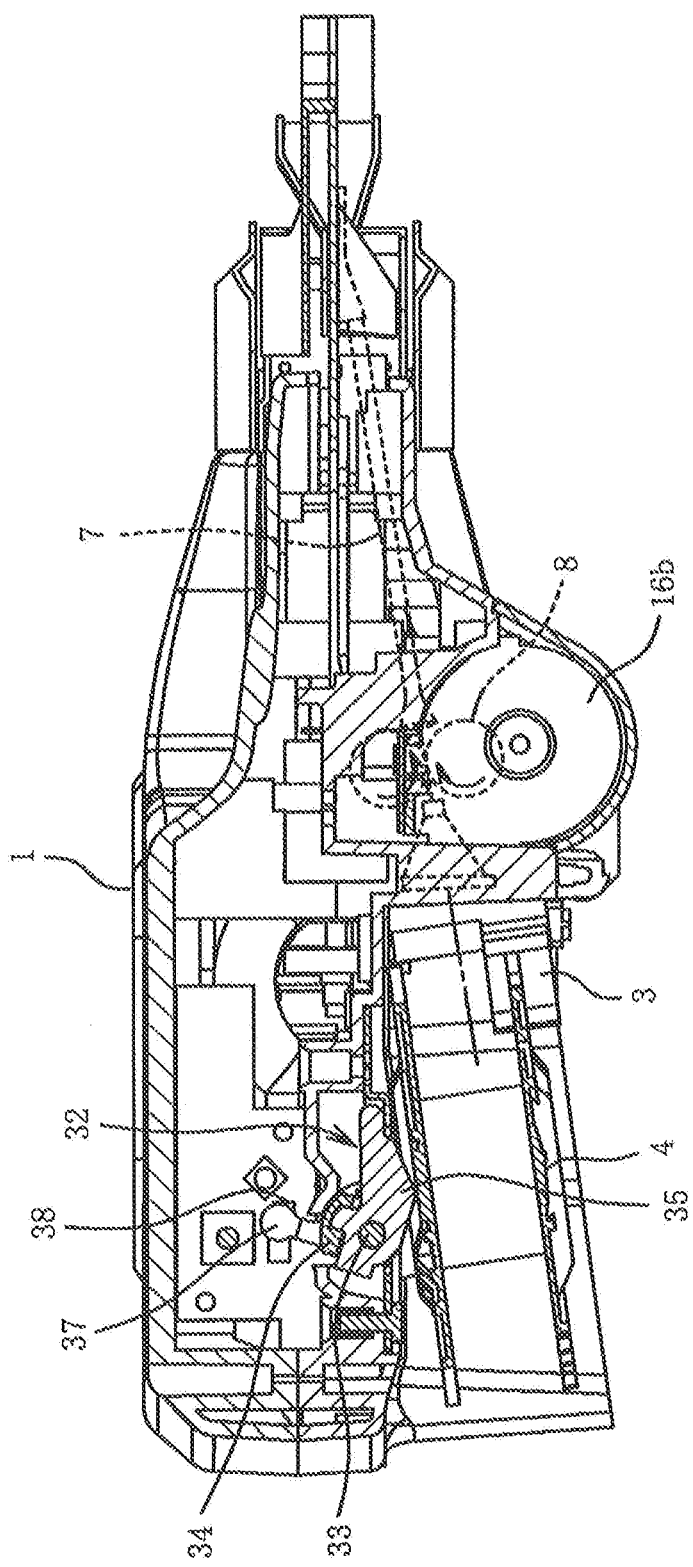
FIG. 4 is a sectional view on a line a-a of FIG. 3.
Figure 11:
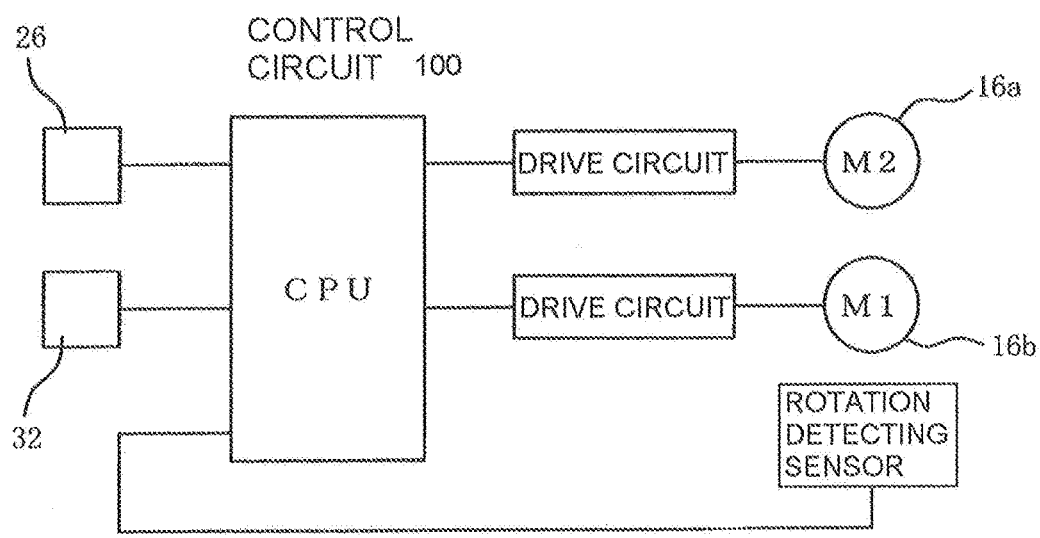
FIG. 11 is a block diagram of a control circuit.

In addition, a wire feeding device by the rotation of the feed gears 8 is driven by the electric motor 16a (refer to FIG. 1), and the twisting device 17 is driven by an electric motor 16b (refer to FIG. 4). The operation or the like of the wire feeding device and the twisting device 17, as shown in FIG. 11, is sequence-controlled by a control circuit. Additionally, the electric motor 16a is provided with a rotation detection sensor by which the rotational amount of the feed gears 8 is detected, and a signal from the sensor is fed back to the control circuit.

Next, a rear portion of the binding machine body 2 is provided with the housing chamber 3 of the wire reel 4 which will be described later. As shown in FIGS. 2, 3, 5, 6, and the like, the housing chamber 3 is constituted by a front wall 21, a bottom wall 22, and side walls 23 and 24 which are provided between the binding machine body 3, and a wall member 18 provided in the binding machine body. One side wall 23 is formed on the side of the binding machine body 2, and the other side wall 24 is forced at the wall member 18. A central portion of the side wall 23 on the side of the binding machine body 2 is formed with a circular protrusion 25. On the other hand, a reel attachment shaft 20 is provided in the position corresponding to the circular protrusion 25 in the wall member 18 so as to protrude to and retract from the housing chamber 3. The circular protrusion 25 and the reel attachment shaft 20 are disposed on the same axis to support the wire reel 4 rotatably. In addition, although the wall member 18 can be opened and closed as shown in FIG. 6, generally, the wall member is fixed to the binding machine body 3 with screws. Correspondingly, the real attachment shaft 20 is provided so an to protrude and retract so that the wire reel 4 can be mounted, and is able to be locked in a state where it has protruded into the housing chamber 3.

Meanwhile, as shown in FIGS. 5 to 8, a transmissive photosensor 26 is arranged at both the side walls 23 and 24. The photosensor 26 is composed of a light-emitting element 27 and a light-receiving element 28, the light-emitting element 27 is provided in a position in the vicinity of the reel attachment shaft 20 of the wall member 18, and the light-receiving element 28 is provided at the circular protrusion 25 on the side of the binding machine body 2. Since the circular protrusion 25 fit into an annular recess 47 (refer to FIG. 5) of the wire reel, ambient light can be prevented from entering the light-receiving element 23.

Additionally, as shown in FIGS. 4 and 6 to 9, a contact sensor 32 is provided at an upper opening 39 (refer to FIG. 7) of the circular protrusion 25 in one side wall 23 of the housing chamber 3. The contact sensor 32 is a mechanical switch, and as shown in FIG. 4, is constituted by a rocking member 34 which is rockably provided at a pivot 33, a contact piece 35 which is provided at the tip of the rocking member 34, a resilient member (not shown) which biases the contact piece 35 toward the wire reel 4, a magnet portion 37 which is provided at the other end of the rocking member 34, and a Hall IC 38 which contact the magnet portion 37 by the resilient member.

The contact sensor 32 is provided within the binding machine body 2, and is constituted by a movable contact piece 35 which protrudes into the housing chamber 3 from an opening formed to pass through the side wall 23, and the magnet portion 37 provided inside the movable contact piece 35, and the Hall IC 38. Projections 41 and 42 (refer to FIGS. 9 and 10) provided at the wire reel 4 are provided on the movable contact piece 35 so as to be able to contact the contact piece. Thereby, when the movable contact piece 35 contacts the projections 41 and 42, the rocking member 34 rocks against the resilience of a resilient member, and the magnet portion 37 is separated from the Hall IC 38, whereby the contact sensor 32 detects the projections 41 and 42.

Figure 8:
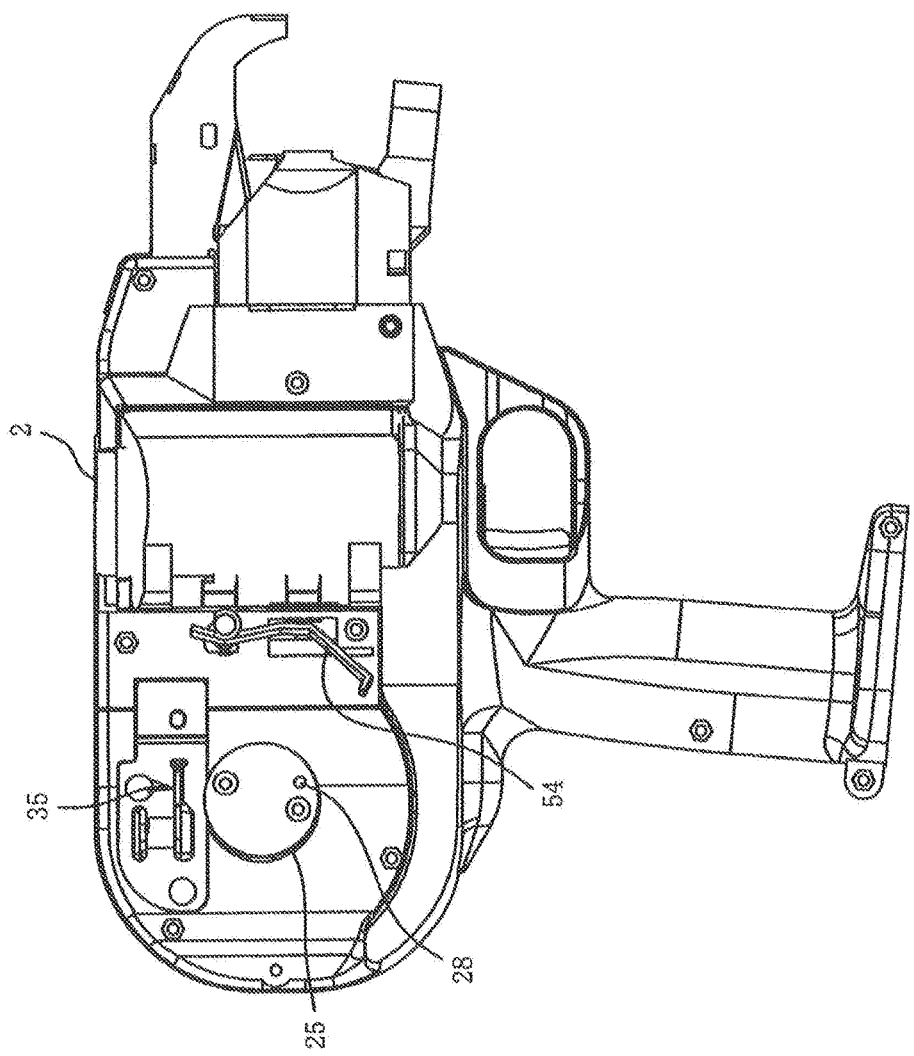
FIG. 8 is a top view of the reinforcing bar binding machine from which a wire reel of FIG. 3 is removed.

In addition, as shown in FIG. 8, the movable contact piece 35 of the contact sensor 32 is located right above the circular protrusion 25, and the light-receiving element 28 of the transmissive photosensor 26 is arranged substantially right below the movable contact piece.

Meanwhile, an output signal of the photosensor 26 is transmitted to the control circuit shown in FIG. 11. The contact sensor 32 is also connected to the control circuit, and an output signal according to a change in the voltage of the Hall IC 38 is also transmitted to the control circuit.

The front wall 21 of the housing chamber 3 is provided with a resilient piece 54 which is engageable with the wire reel 4. When wire feed is ended, the wire reel 4 is engaged with the resilient piece 54 by an electric motor to stop rotation.

Next, the wire reel 4 will be described on the basis of FIGS. 12 to 19. The wire reel 4 is formed of plastics, such as ABS resin, polyethylene, and polypropylene which have excellent resistance against wear or bending, and is made of black plastics so that ambient light does not enter. The wire reel 4 is detachably provided in the housing chamber 3 provided in the binding machine body 2 (refer to FIG. 2), and is composed of a hub portion 43 which winds the wire 5, and disk-like flanges 44 and 45 which are provided on both sides of the hub portion 43. The hub portion 43 is formed in a cylindrical shape, and is formed integrally with the pair of flanges 44 and 45. An outer periphery of one flange 44 is formed with an engaging pawl 46 which is engagable with the resilient piece 54 for a brake of the housing chamber 3.

The flange 45 is formed with an annular recess 47 which is engageable with the circular protrusion 25 of the reinforcing bar binding machine 1, and a ring-shaped boss 43 is formed so as to surround the annular recess 47. An outer peripheral edge of the boss 48 is provided with a tapered surface 50. A bottom portion of the annular recess 47 extends to near an end surface of an inner tube 40 which is shown below. Moreover, the pair of trapezoidal projections 41 and 42 is formed on mutually opposite sides of the inner tube 40 at the outer peripheral edge 50 of the boss 43. Oblique edges 55 (refer to FIG. 10) are formed on both sides of the projections 41 and 42.

Figure 15:
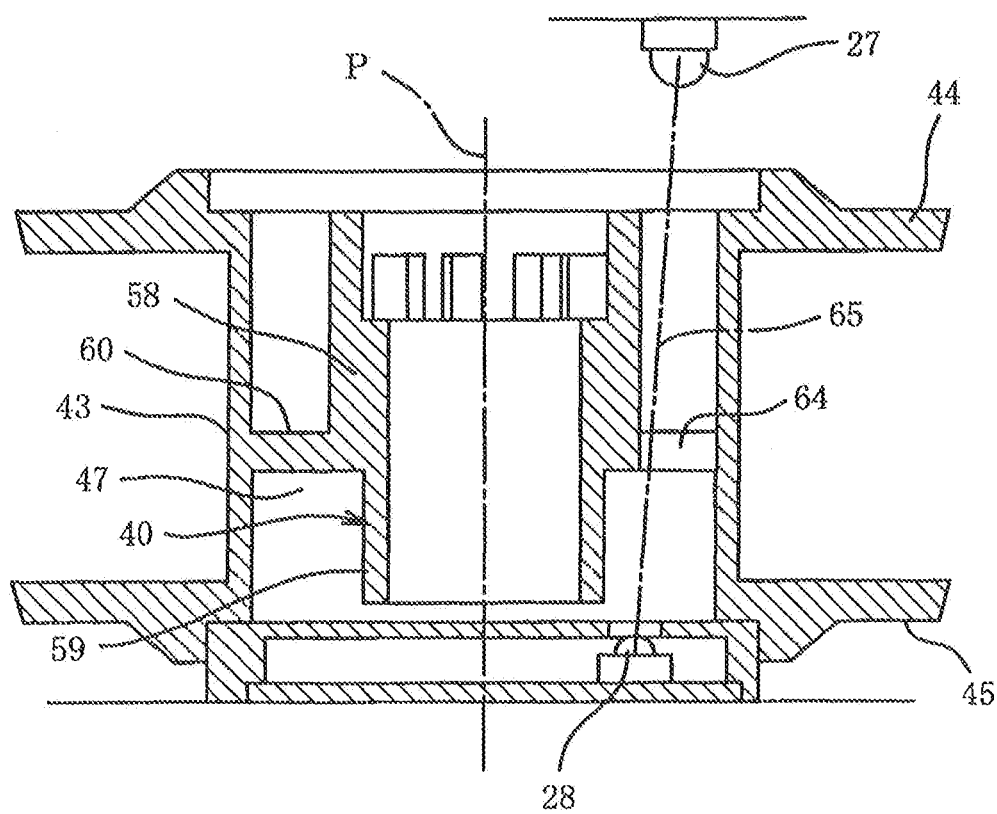
FIG. 15 is a sectional view on a line d-d line of FIG. 10.

A central portion of the hub portion 43 is formed with the inner tube 40 which is substantially coaxial with the hub portion 43, and an attaching hole 56 (refer to FIG. 5) which can be fit to the reel attachment shaft 20 of the wall member 18 of the reinforcing bar binding machine 1 is formed inside the inner tube 40. As shown in FIG. 15, the inner tube 40 and the hub portion 43 are connected together by a side wall 60.

The wall thickness of the inner tube 40 is not uniform. As shown in FIG. 15, the inner tube is thicker at the flange 44 than the middle thereof, and is formed so as to have a smaller wall thickness at the flange 45. This is because the wall thickness of a side portion 58 of teeth 57 is made large in order to secure strength in order to make a rotary shaft of a winding device (not shown) mesh with the teeth 57 formed at the end of the inner tube 40 on the side of the flange 44, thereby forcibly winding the wire reel 4, when a wire is wound around the wire reel 4. The side wall 60 is formed at the boundary between a thick-walled portion 58 and a thin-walled portion 59. For this reason, the side wall 60 is located slightly nearer to the flange 45 than the middle thereof, and the circular recess 47 is formed by internal surfaces or the inner tube 40 and the hub portion 43. In addition, the outer peripheral edges of the flanges 44 and 45 are formed with reinforcing ribs 61.

Figure 18:
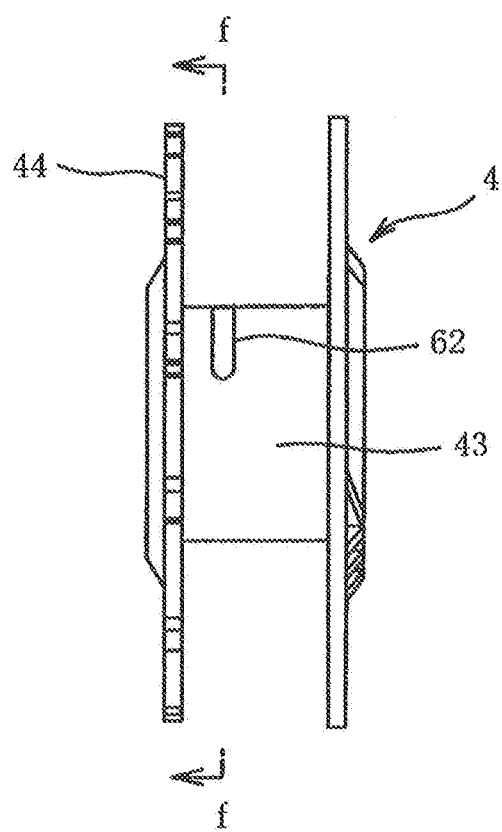
FIG. 18 is a front view of the wire reel.
Figure 19:
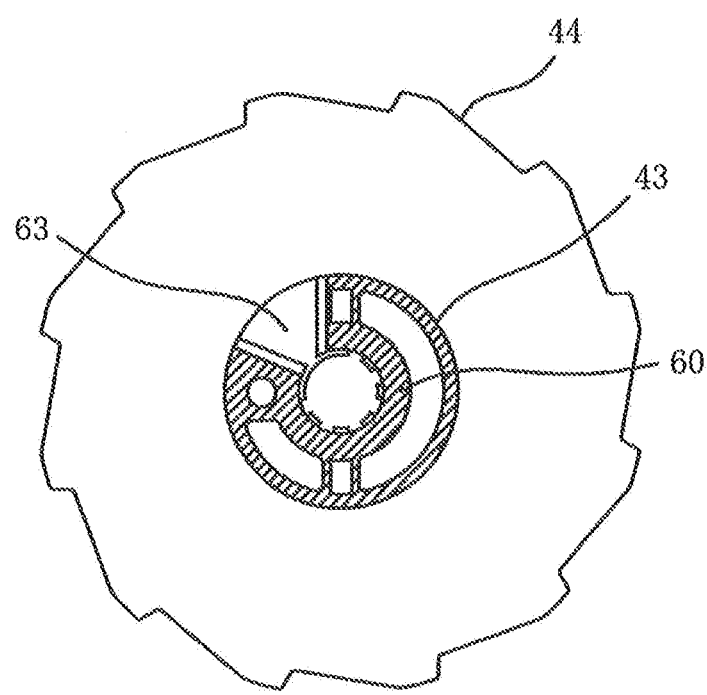
FIG. 19 is a sectional view on a line f-f of FIG. 16.

Additionally, as shown in FIGS. 18 and 19, the flange 44 is formed with a wire insertion opening 62 which extends from the outer peripheral edge toward the hob portion 43. A winding termination end of the wire 5 in locked and held by the wire insertion opening 62. A wire insertion hole 63 is formed in the hob portion 43 and inner tube 40. A winding starting end of the wire 5 is looked and held by the wire insertion hole 63. When the wire 5 is wound, the winding starting end of the wire 5 is inserted into the wire insertion hole 63, and is wound within the inner tube 40 so as to prevent the winding starting end from slipping out of the wire insertion hole 63. In this state, winding around an inner peripheral surface of the hub portion 43 is started. Additionally, even if a force in a winding direction of a wire 5 acts strongly, a tension can be received by the edge of the wire insertion hole 63.

Figure 12:
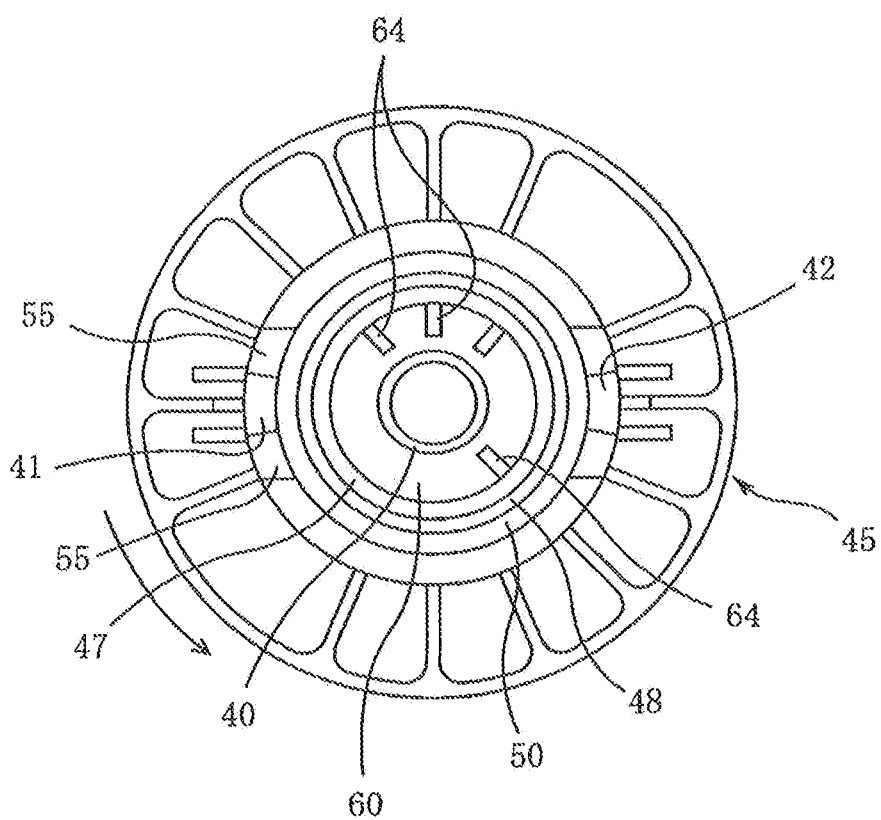
FIG. 12 is a side view of the wire reel.
Figure 13:
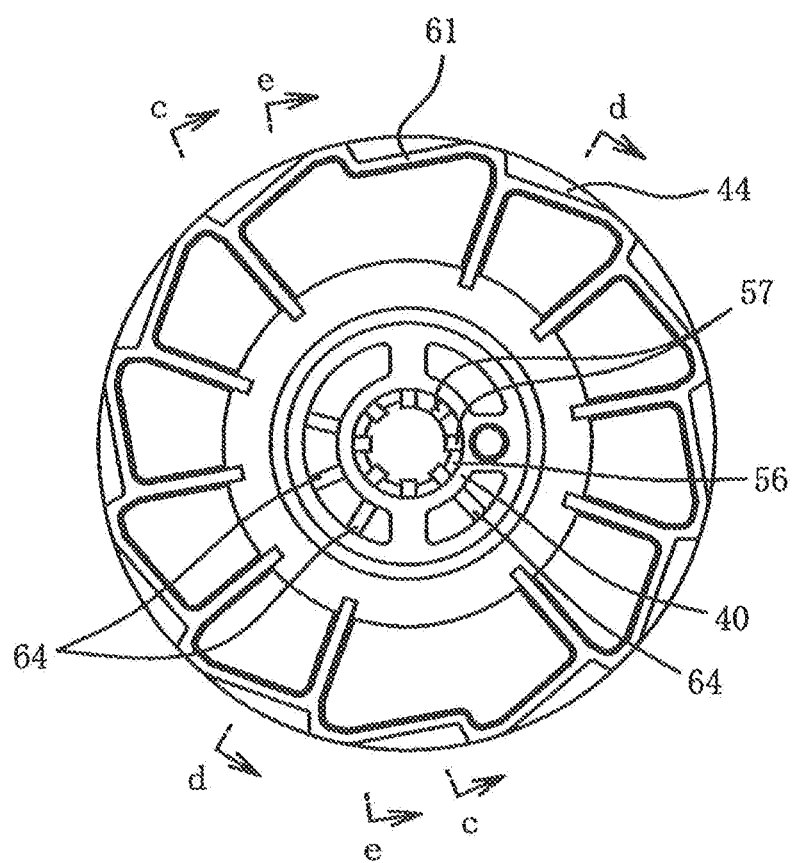
FIG. 13 is a side view of the side of the wire reel opposite to FIG. 10.
Figure 14:
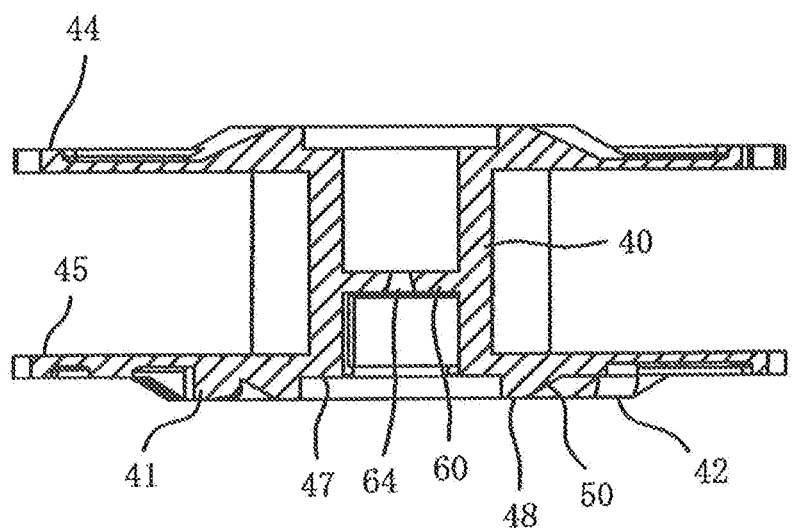
FIG. 14 is a sectional view on a line c-c of FIG. 10.

Additionally, the side wall 60, as shown in FIGS. 12 to 14, is formed with transmission holes 64 serving as a light-transmitting portion for detecting the rotational position of a wire reel 4 or the type of a wire. These transmission holes 64 transmit the light from the light-emitting element 27 of the transmissive photosensor 26 (refer to FIG. 5) provided in the binding machine body 2, and are formed on a circumference about the axial center of the wire reel 4, i.e., the axial center of the inner tube 40.

Figure 9:
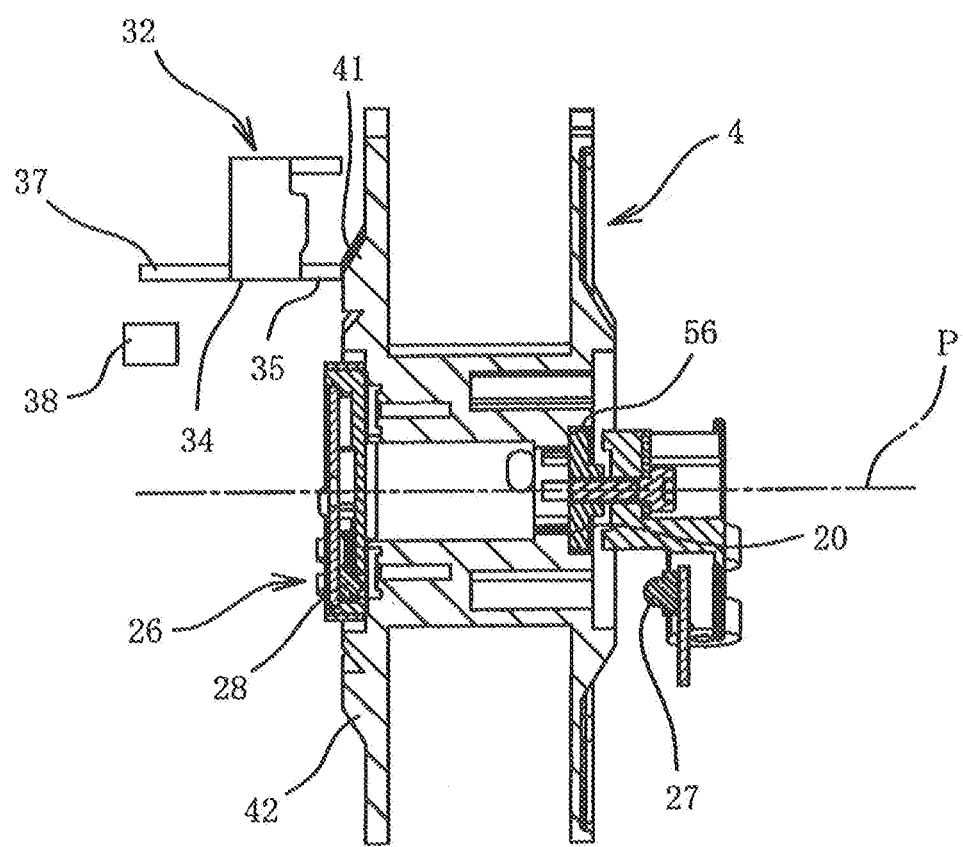
FIG. 9 is a sectional view of essential portions showing a state where a sensor is arranged.
Figure 10:
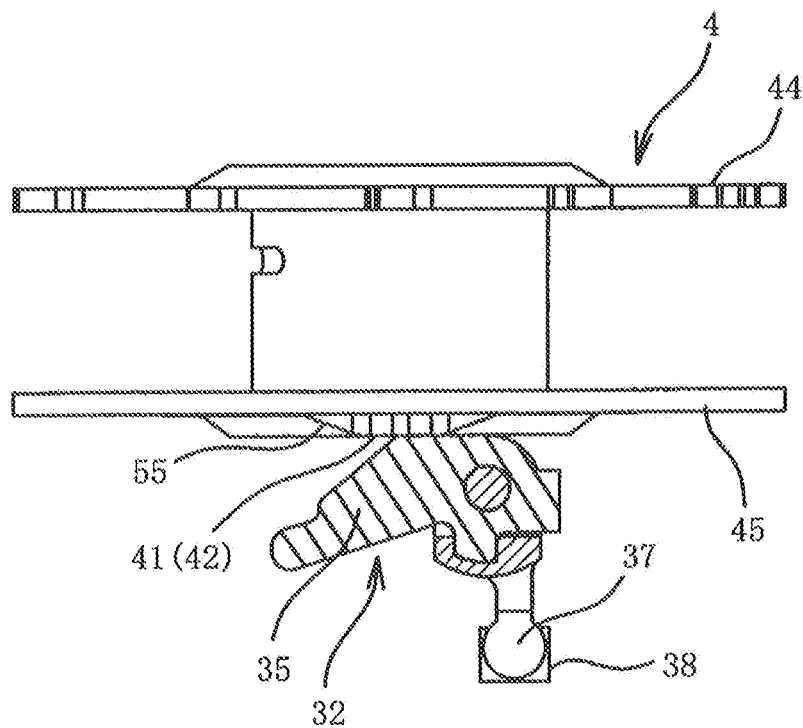
FIG. 10 is a plan view showing the positional relationship between the contact sensor and the wire reel.

Meanwhile, as shown in FIGS. 9 and 15, the light-emitting element 27 and the light-receiving element 28 is arranged so that the light-emitting element 27 becomes distant from the axial center P of the wire reel 4, and the light-receiving element 28 becomes close to the axial center P of the wire reel 4 due to constraints of attachment, and an optical axis 65 deviates the axial center P of the wire reel 4. Additionally, there is a possibility that the optical axis 65 of the light emitted from the light-emitting element 27 may deviate in the rotational direction or the radial direction of the wire reel 4 even during the rotation of the wire reel 4.

Thus, in order to cope with deviation of the optical axis 65, and deviation generated at the time of rotation, the transmission holes 64 are formed as long holes which are long in the radial direction from the axial center P of the wire reel 4. The width of the transmission holes 64 requires a width of about 1.5 mm to 2.5 mm in order to obtain high resolution and cope with deviation in the relational direction. By forming the transmission holes 64 long in the radial direction like FIG. 15, it is possible to cope with radial deviation of the optical axis 65 emitted toward the light-receiving element 28 from the light-emitting element 27. Additionally, deviation of the optical axis 63 caused by the play between the wire reel 4 and the housing chamber 3 can also be absorbed.

In addition, although resolution can be given by making even the diameter of the circular transmission holes small, the optical axis deviates as described above. Thus, the transmission holes just have to be formed in the vicinity of the position corresponding to the optical axis, i.e., the axial center of the wire reel 4.

In addition, the light which is transmitted through the transmission holes 64 spreads. Thus, when the transmission holes 64 are brought close to the inner wall surface 66 of the inner tube 40 as shown by one-dot chain line in FIG. 17, the light emitted and spread from the light-emitting element 27 strikes the inner wall surface 66 and is reflected therefrom before reaching the transmission holes 64, and the reflected light reaches the light-receiving element 28, which causes erroneous detection. Additionally, when the transmission holes 64 are formed straight, there is a possibility that a portion of the light from the light-emitting element 27 may strike inner surfaces 67 of the holes, and be reflected therefrom. This also causes erroneous detection when the reflected light reaches the light-receiving element.

Figure 16:
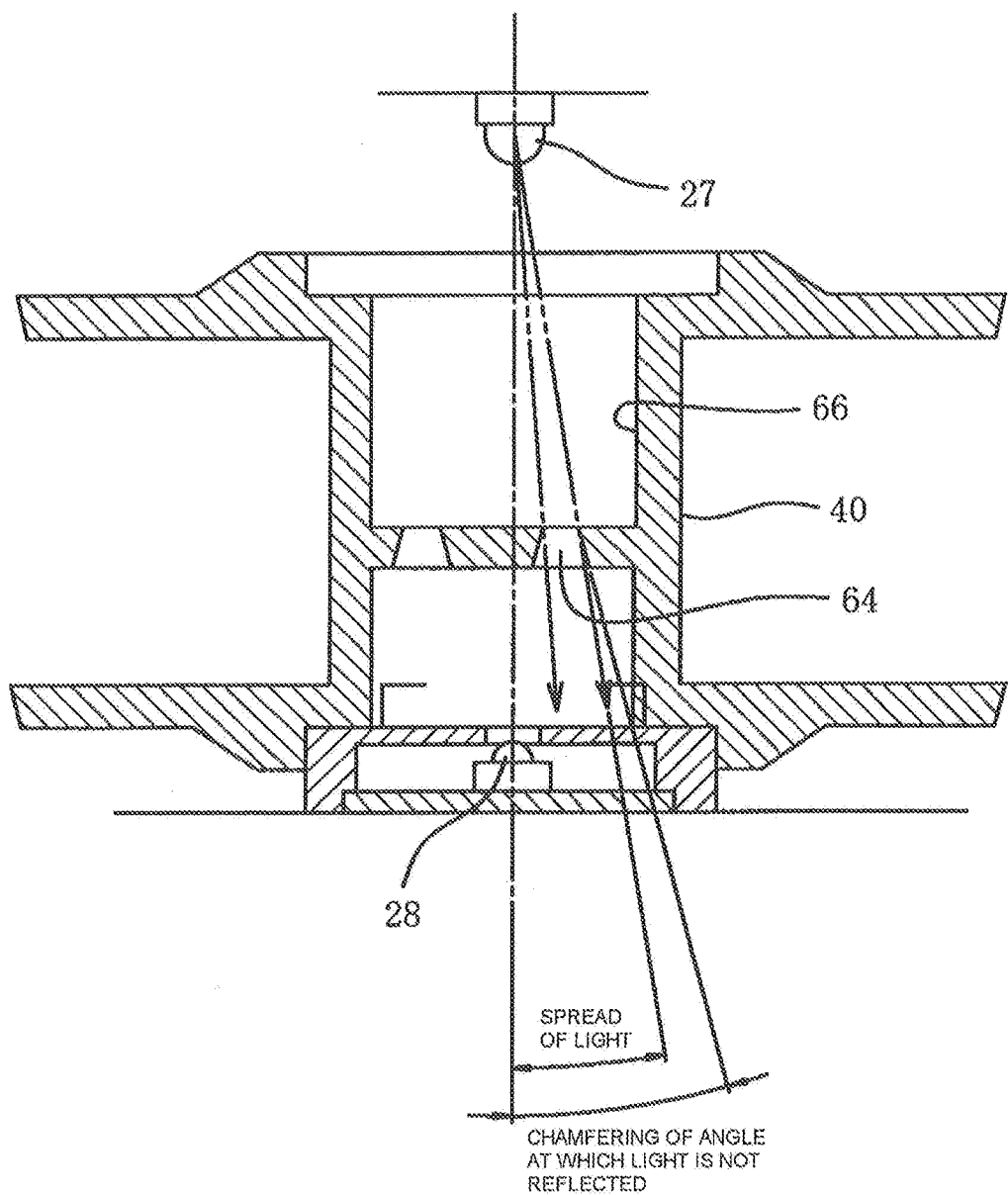
FIG. 16 is a sectional view on a line e-e of FIG. 10.
Figure 17:
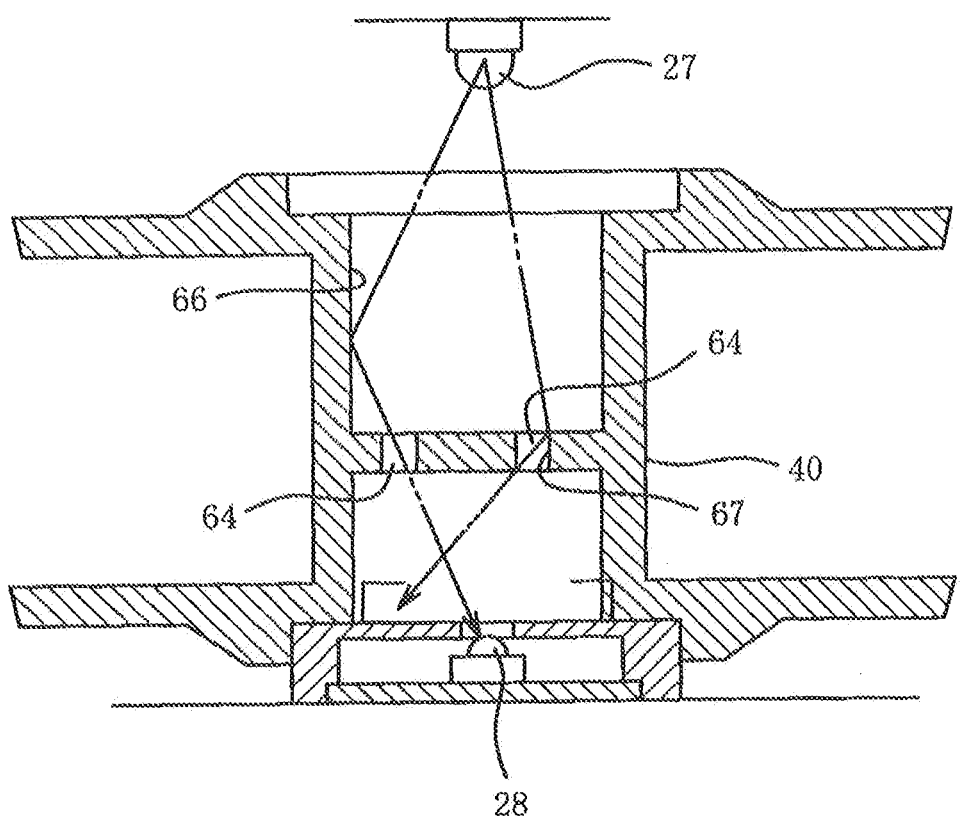
FIG. 17 is a sectional view showing a form which is not preferable.

In order to prevent the reflection, as shown in FIG. 16, it is preferable that the transmission holes 64 be spaced from the outer wall surface 66 of the inner tube 40 so that reflected light at the surfaces in front of the transmission holes 64 is not received, and opening ends of the transmission holes 64 are made as small as possible so as to make it difficult for reflected light to enter the holes. Additionally, the inner surfaces 67 are chamfered and the sections thereof in the rotational direction may be formed in a tapered shape so that light is not reflected by the inner surfaces 67 of the transmission holes 64, and so as to have almost the same angle as the angle of the incident light which has entered from the opening ends of the transmission holes 64. Moreover, the side wall 60 where the transmission holes 64 are formed in a position slightly nearer to the light-receiving element 28 than the middle between the light-emitting element 27 and the light-receiving element 28. Thereby, since light which has transmitted through the transmission holes 64 reaches the light-receiving element 28 without spreading so much, erroneous detection hardly occurs.

Figure 5:
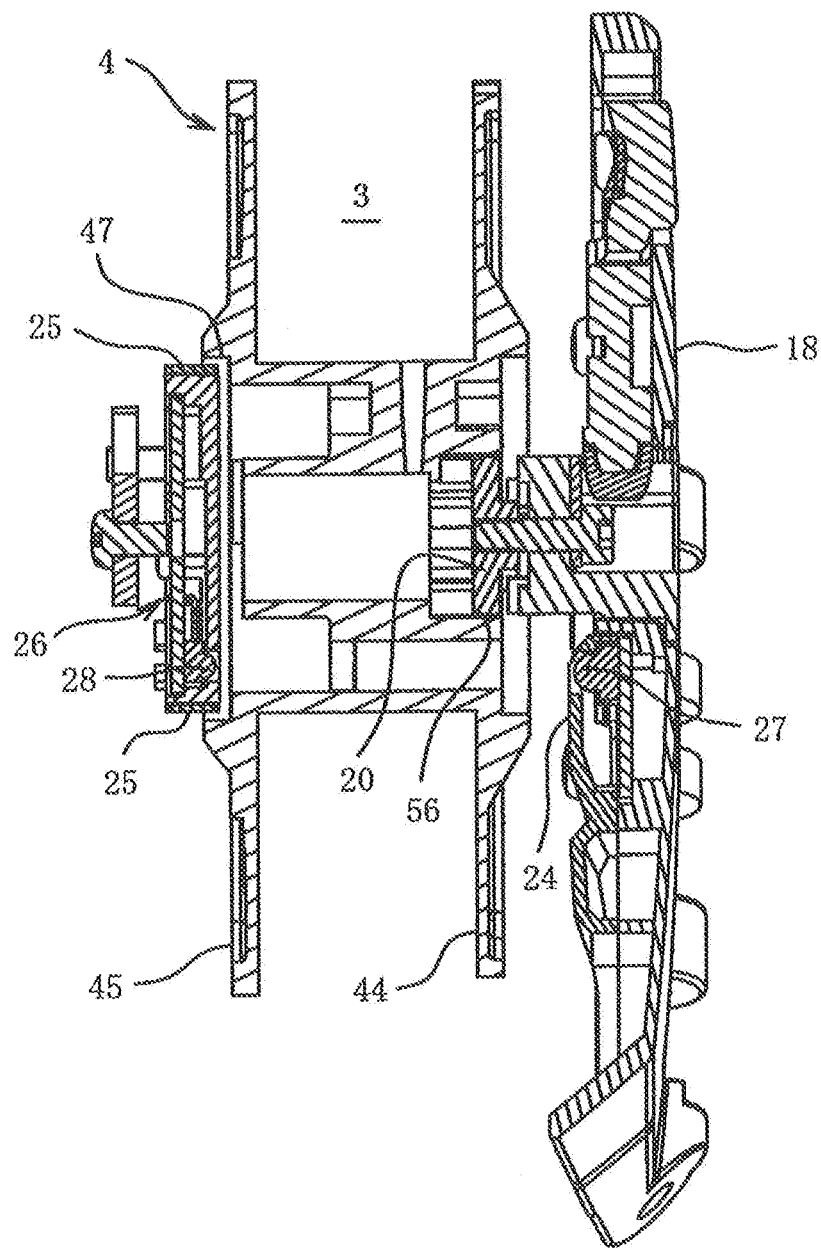
FIG. 5 is a sectional view on a line b-b of FIG. 3.
Figure 6:
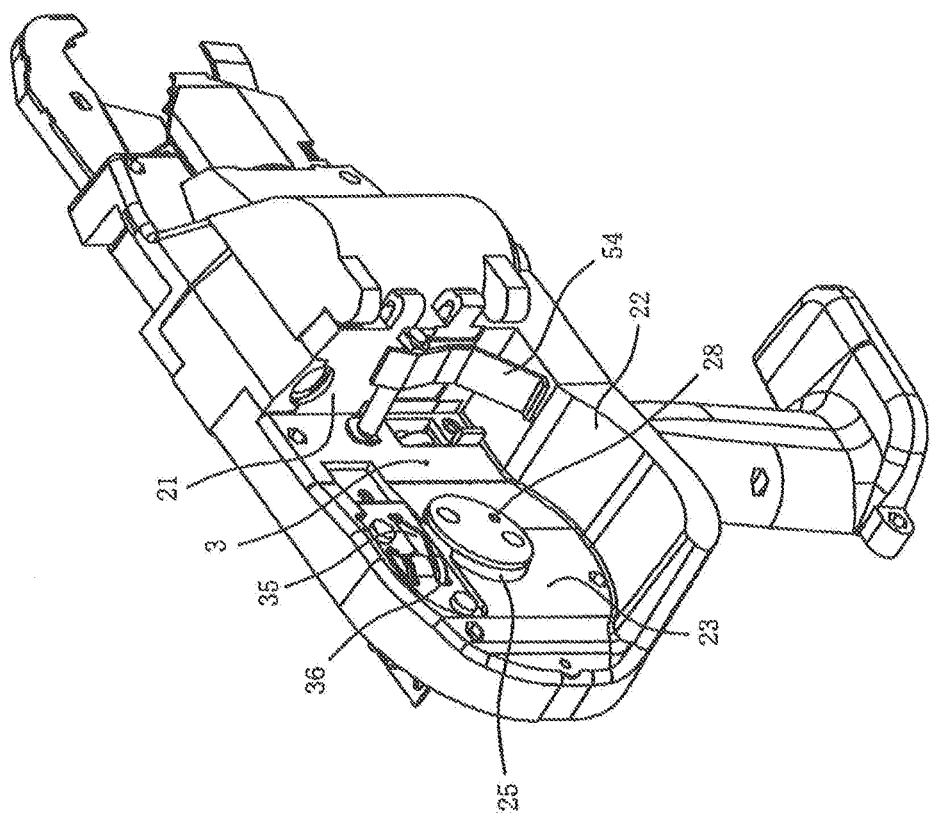
FIG. 6 is a perspective view of the reinforcing bar binding machine from which a wire reel of FIG. 2 is removed.
Figure 7:
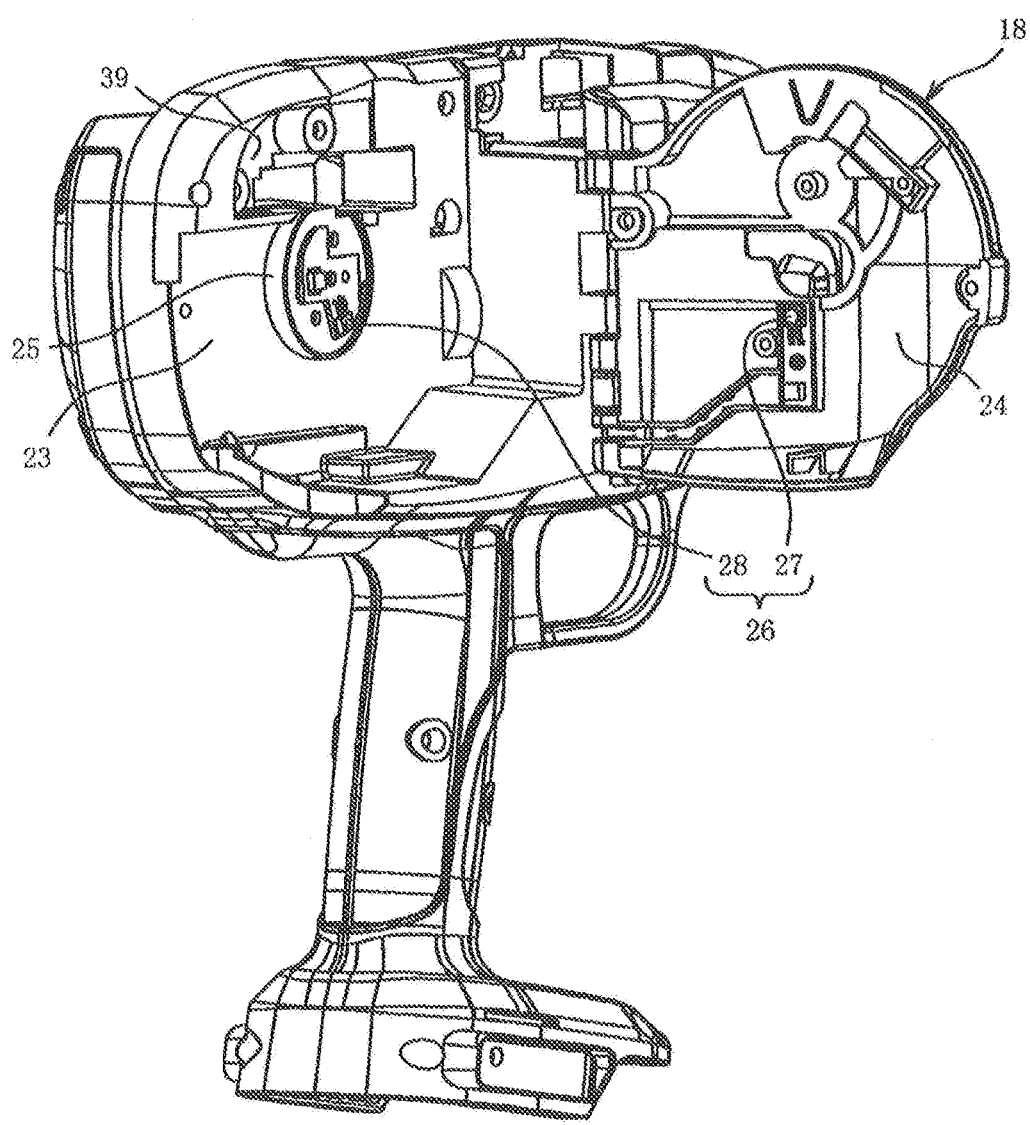
FIG. 7 is a perspective view showing the inside of a housing chamber by opening the wall member.

When the wire reel 4 is stored and loaded into the housing chamber 3 of the binding machine body 2, the reel attachment shaft 20 of the wall member 18 shown in FIG. 5 may be made to retreat from the housing chamber 3, thereby putting the wire reel 4 into the housing chamber 3, the annular recess 47 of the wire reel 4 may be fitted to the circular protrusion 25 formed on the side wall 24 of the housing chamber 3, and the reel attachment shaft 20 may be inserted into and locked to the attaching hole 56 of the wire reel 4.

According to the above-described configuration, a transmissive photosensor having a light-transmitting element on one of both side walls of the housing chamber of the reinforcing bar binding machine and a light-receiving element on the other side wall is provided, the wire reel is formed with a plurality of transmission holes which allow the light emitted from the light-emitting element to be transmitted therethrough, and a control circuit is provided to determine the rotational information of the wire reel according to the number of the light-transmitting holes detected by the photosensor during rotation of the wire reel. Thus, since the light generated in the light-emitting element and transmitted through the transmission holes provided in the wire reel are detected by the light-receiving element, detection is allowed without being influenced by irregularity on the surface of the wire reel, and the detection accuracy of rotational information improves.

Additionally, since the light generated in the light-emitting element is directly detected by the light-receiving element, a sufficient quantity of light can be received by the light-receiving element even if a detection portion is smaller compared with a reflective photosensor, and the resolution of the sensor can be improved.

Moreover, as the resolution of the sensor improves, the accuracy of detection of the feed amount of a wire converted from the rotational amount of the reel also improves, and a decrease in the wire feed amount can be detected.

Since the transmission holes are formed as slit-like long holes which are long in the radial direction of the wire reel, detection is allowed even it the axes of the light-receiving element and the light-emitting element are shaken due to vibration or the like during operation, and do not completely coincide with each other.

Moreover, the light-emitting element and the light-receiving element cannot help being arranged in the position where the optical axis deviates from the axial center of the wire reel, and does not become parallel, due to constraints on attachment. Additionally, there is a possibility that the optical axis of the light emitted from the light-emitting element may deviate in the rotational direction or the radial direction of the wire reel even during the rotation of the wire reel. However, since the transmission holes which allows the light emitted from the light-emitting element to be transmitted therethrough are formed in a slit shape which is long in the radial direction of the wire reel, it is possible to cope with radial deviation of the optical axis. In other words, one of the light-emitting element and the light-receiving element can be arranged nearer to the axial center of the wire reel than the other element, and it is not necessary to necessarily provide the optical axis from the light-emitting element parallel to the axial center of the wire reel. Thus, the degree of freedom of design increases.

Figure 20:
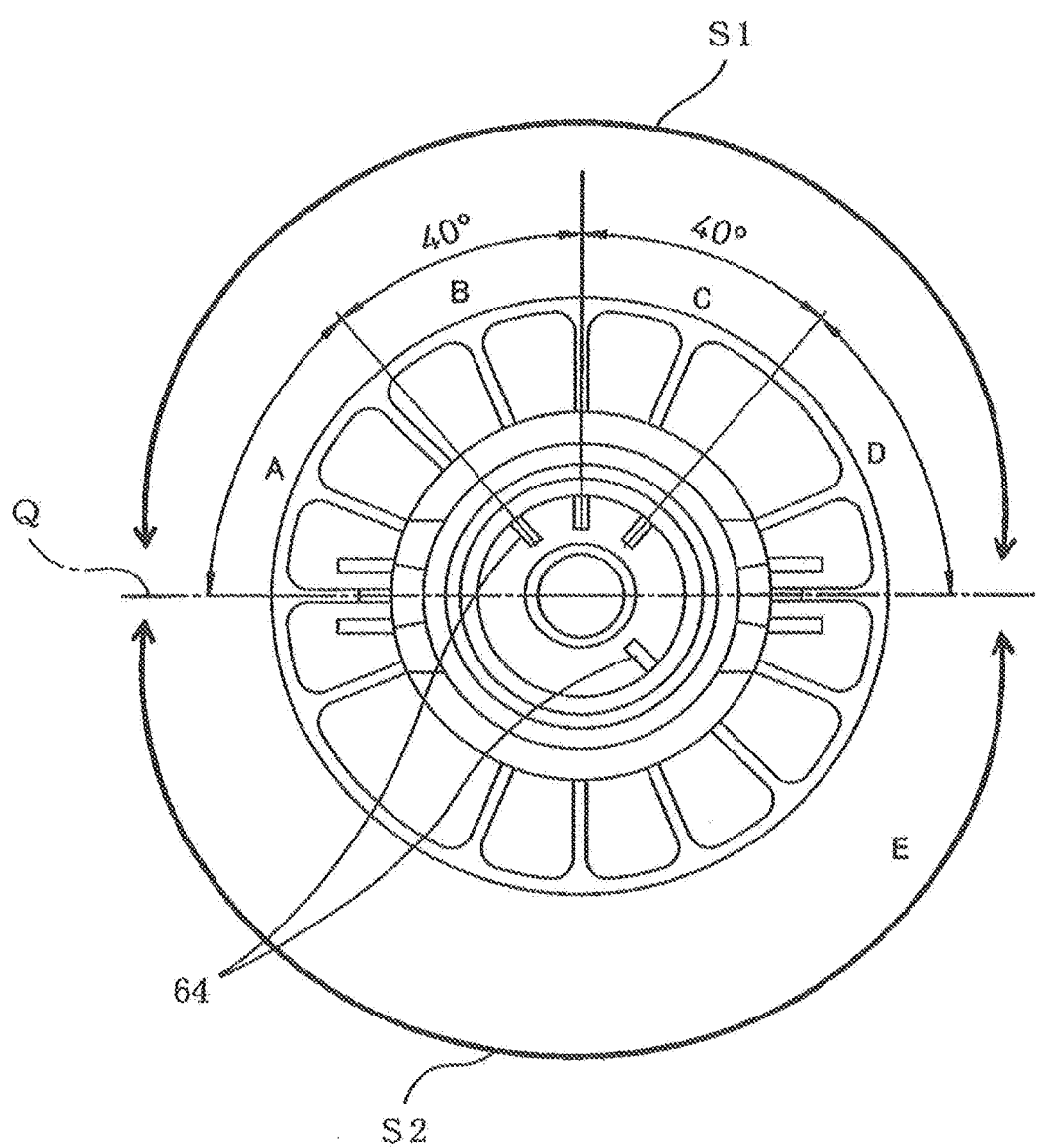
FIG. 20 is a side view showing details of an information detection region of the wire reel.

Meanwhile, as shown in FIG. 20, the wire reel 4 is formed with two information detection regions to be detected by a transmissive photosensor. One information detection region (first information detection region S1) is formed with three transmission boles 64, and the other information detection region (second information detection region S2) is formed with one transmission hole 64. The information detection regions S1 and S2 are regions where the transmission holes 64 can be detected between two signals which are output as the two projections 41 and 42 are detected by the contact sensor 32, and the three transmission holes 64 of the first information detection region S1 are formed on lines which form 40° mutually between a borderline Q between the first information detection region S1 and the second information detection region S2. In contrast, the transmission hole 64 of the second information detection region S2 is formed rear the right side of the drawing.

Figure 21:
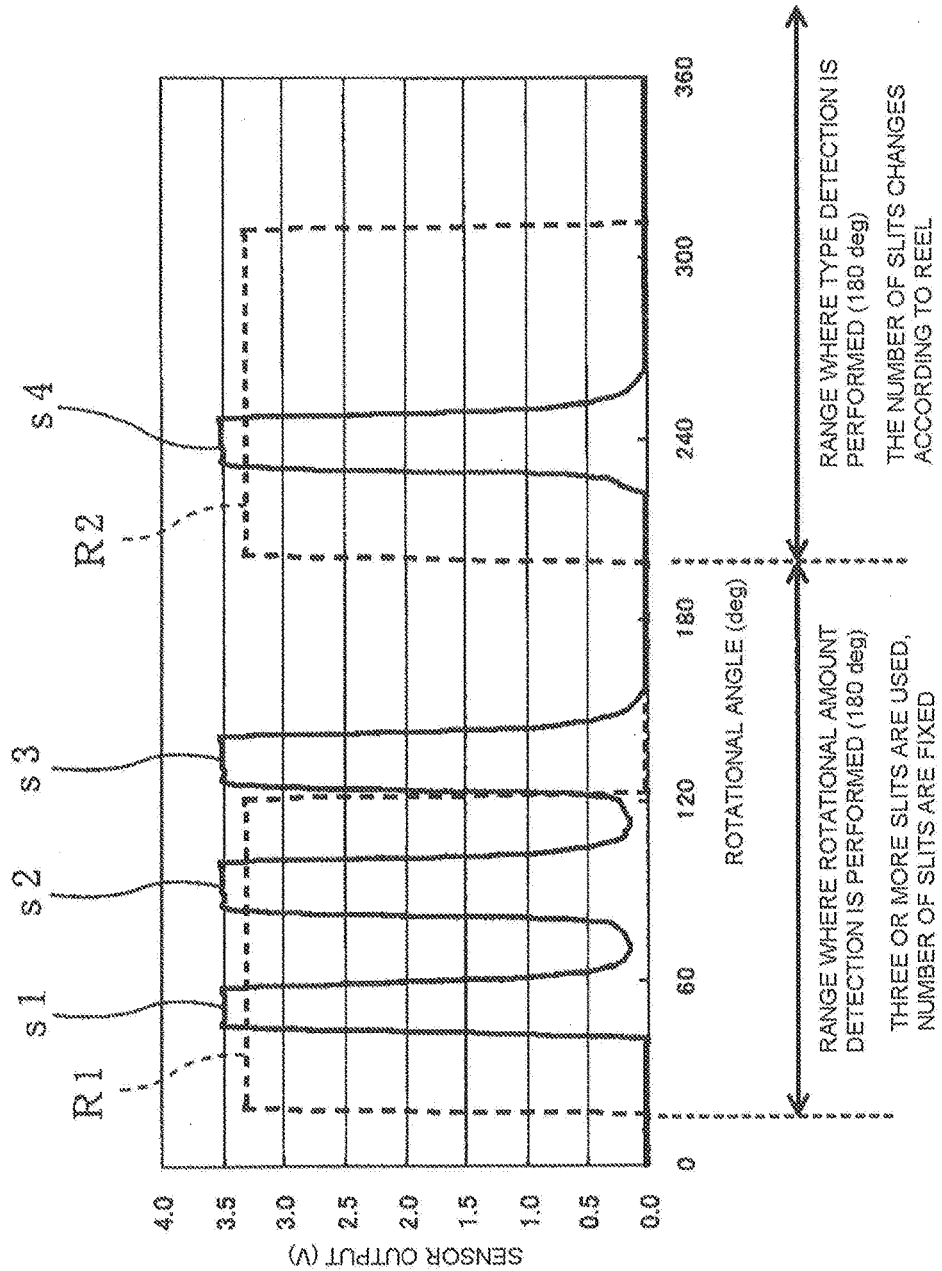
FIG. 21 is a chart showing the output waveform during the rotation of the wire reel.

Thus, when the projection 41 of the wire reel 4 and the transmission holes 64 were detected by the contact sensor 32 and the transmissive photosensor 26 in order to confirm the accuracy of detection, the detected wave shown in FIG. 21 was obtained. According to this, since only the light transmitted through the transmission holes 64 is detected, the accuracy of detection improves without being influenced by irregularities of the surface of the wire real 4. That is, if the diameter of a detected portion should be about 8 mm in a reflective photosensor, the transmissive photosensor 26 can perform detection even in the transmission holes 64 with a width of about 2 mm. For this reason, the resolution of the sensor improves to about 40°. Accordingly, although the three transmission holes 64 are provided in the first information detection region S1 at every angle of rotation of 40° in the above-described embodiment, sufficiently high resolution can be exhibited even if four transmission holes 64 are provided.

Next, when a detection signal obtained by detecting the projections 41 and 42 is used as a reference, information having different meanings can be detected in the two information detection regions S1 and S2 because different numbers of transmission holes 64 are provided in the first information detection region S1 and the second information detection region S2. For example, as will be described later, the first information detection region S1 of the wire reel 4 is able to fix the number of the transmission holes 64 to detect rotational amount, and change the number of the transmission holes 64 of the second information detection region S2 according to the type of the wire reel 4, thereby detecting the type of the wire reel 4. For this reason, the resolution of the photosensor 26 improves, whereby the amount of information of the wire reel 4 increases. As a result, different kinds of information, such as information as a measure which detects the rotational amount of the wire reel 4 by an array method of the transmission holes 64 or information which identify the type of the wire reel 4, can be given.

Thus, a method of detecting the rotational amount of the wire reel 4 on the basis of the two kinds of sensors, and the array of the projection and transmission holes 64 corresponding thereto will be described.

In order to detect the rotational amount of the wire reel 4, it is necessary to detect a rotation start position and a rotation stop position by two kinds of sensors.

Meanwhile, as shown in FIG. 20, a detection signal of the projections 41 and 42 by the contact sensor 32 are output whenever the first information detection region S1 that is an upper half, and the second information detection region S2 that is a lower half are rotated by every half-circumference. This detection signal becomes a timing signal for reference. As a result, as shown in FIG. 21, while the next reference signal R2 is output from a reference signal R1, three detection signals S1, S2, and S3 in the information detection region S1 and one detection signal S4 in the information detection region S3 are output according to the number of the transmission holes 64 detected by the photosensor 26 whenever the wire reel 4 rotates by every half-circumference. Thus, the rotation start position and stop position of the wire reel 4 can be detected in the following way.

Hereinafter, description will be made referring to the flow chart of FIG. 22.

Firstly, when the wire reel 4 is mounted on the binding machine body, and is rotated, either the contact sensor 32 or the photosensor 26 previously detects the transmitted light of the projections 41 and 42 which are detected portions, or the light-emitting element 27 (step 101). That is, when the mire reel 4 rotates, and the projection 41 and 42 of the wire reel 4 contacts the movable contact piece 35 of the contact sensor 32, the movable contact piece 35 rocks, the magnet portion 37 is separated from the Hall IC 38, and a pulse signal according to a change in voltage is transmitted to the control circuit of FIG. 11. Further, when the light irradiated from the light-emitting element 27 is transmitted through the transmission boles 64 and is detected by the light-receiving element 28, a detection signal is transmitted to the control circuit. The control circuit detects the fluctuation of the output voltage of the sensor 32 or 26 generated by the detection signal, and calculates the number of the projections 41 and 42 or the transmission holes 64.

Figure 22:
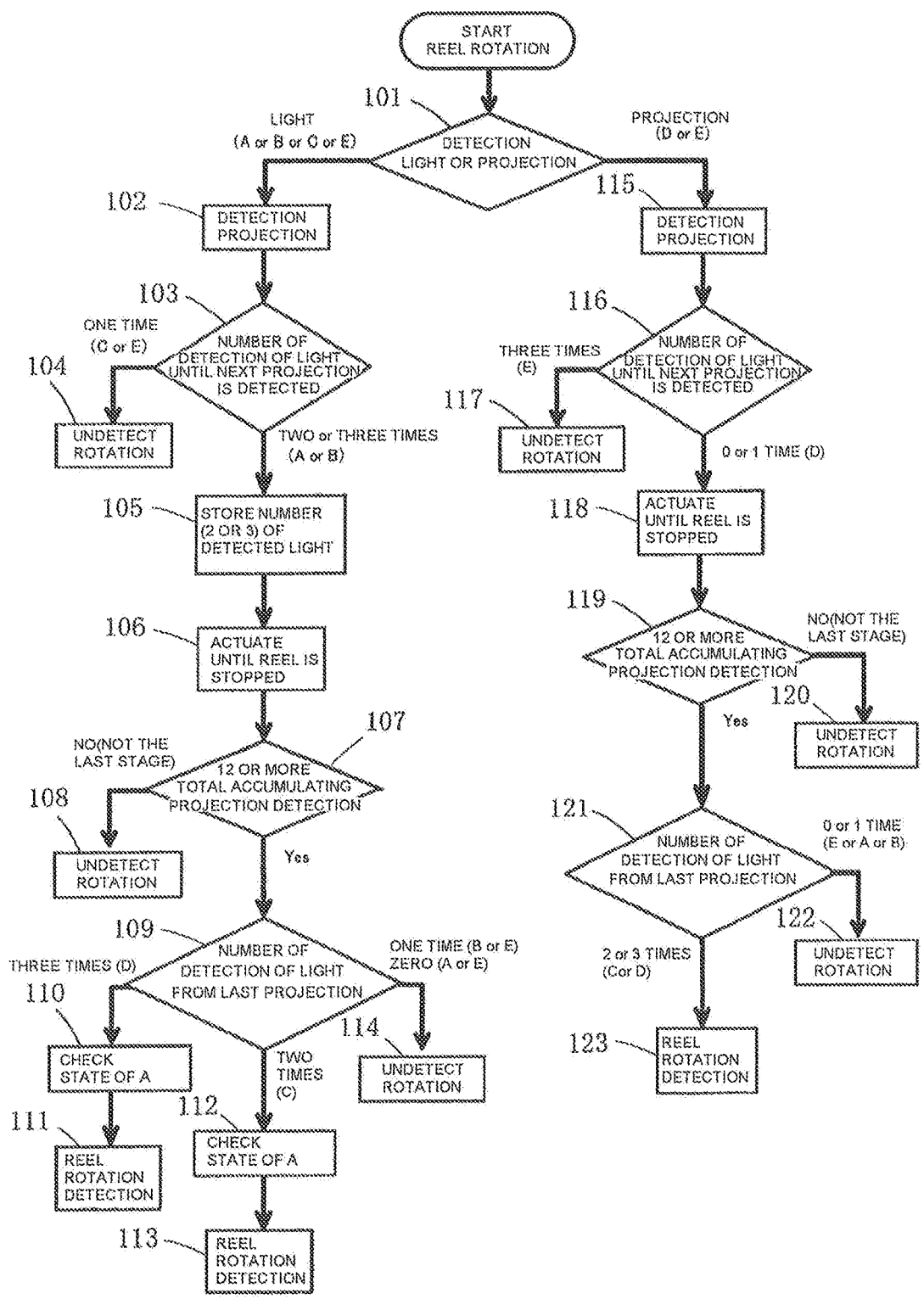
FIG. 22 is a flow chart showing detection of the rotational amount of the wire reel.

Thus, first, when the photosensor 26 previously detects light before the contact sensor 32, the process proceeds to the left flow of FIG. 22. First, the wire reel 4 is in the region of A, B, C, or E of a FIG. 20. When the wire reel is in the position of D, since the contact sensor 32 detects the projection 41 or 42 previously (Sep 102), this case is not applied.

Thus, it is determined how many times the control circuit has detected the transmitted light until the next projection 42 or 41 is detected (Step 103). When the number of times of detection is one, detection start position is either C region or E region. If the detection start position is the E region, since the rotational angle from one end of the region to the other end thereof, an error is large in detecting rotational amount. Since whether the detection start position is the C region or the E region cannot be determined, rotation is hot detected in this case (Step 104).

On the other hand, when the transmitted light has been detected two or three times, the detection start position is either A region or B region. In this case, the number of times of detection, whether it is two times or threes times, of the photosensor 26, i.e., whether the detection start position is the A region or the B region is stored (Step 105).

In the next Step 106, binding operation is continued until the wire reel 4 stops (Step 106).

Then, rotation is not detected until the number of times of detection by the contact sensor 32 is twelve or more in an accumulating total, i.e., until the wire reel 4 rotates six times or more (Steps 107 and 108). This is because the relationship between the rotational amount of the wire reel 4 and the feed amount of the wire 5 is unstable at early and middle stages of rotation. That is, the possibility that the wire 5 is wound around the wire reel 4 with looseness at the early and middle stages of rotation is high. In this case, the rotational amount of the wire reel 4 decreases compared with the feed amount of the wire 5. On the other hand, since the wire 5 is densely wound around the wire reel 4 at the last stage of rotation, the feed amount of the wire can be accurately calculated on the basis of the rotational amount of the wire reel 4.

When the number of times of detection by the contact sensor 32 is twelve or more in an accumulating total, waiting is performed until the wire reel 4 stops rotation, the contact sensor 32 detects a projection finally, and it is then determined how many times the photosensor 26 has detected the transmitted light (Step 109). If the number of times of detection is three times, the wire reel 4 stops in the region of D. In this case, the state of A is cheeked (Step 110), and the rotation of the wire reel 4 is detected (Step 111). When the number of times of detection is two times, the wire reel stops in the region of C. In this case, the state of A is checked (Step 112), and the rotation of the wire reel 4 is detected (Step 113).

On the other hand, when the number of times of detection is one time, the stop position of the wire reel 4 is the C region or E region. Additionally, when the number of times of detection is zero time, the stop position of the wire reel 4 is A region or E region. Since all the stop positions include the E region, detection of rotation is not performed due to the above-described reason (Step 114).

Next, when the contact sensor 32 previously detects light before the photosensor 26, the process proceeds to the right flow of FIG. 22. First, when the projection 41 or 42 is previously detected is when the detection start position is in D region or E region (Step 115).

Further, it is determined how many times the control circuit has detected the transmitted light until the next projection 42 or 41 is detected (Step 116). If the transmitted light has been detected three times, since the detection start position is E region, rotation is not detected in this case (Step 117).

When the transmitted light has been detected zero or one time, since the detection start position is D region, binding operation is continued until the wire reel 4 stops (Step 118).

Then, rotation is not detected until the number of times of detection of the contact sensor 32 is twelve or more in an accumulating total (Step 119), i.e., until the wire reel 4 rotates six times or more (Step 120).

When the number of times of detection of the contact sensor 32 is twelve or more in an accumulating total, waiting is performed until the wire reel 4 stops rotation, the contact sensor 32 detects the projection 41 or 42 finally, and it is then determined how many times the photosensor 26 has detected the transmitted light (Step 121). If the number of times of detection is zero or one time, the wire reel 4 stops in any of the E region, the A region, and the B region. Since this case includes the E region, detection of rotation is not performed due to the above-described reason (Step 122).

On the other hand, when the transmitted light has been detected two or three times, the detection start position is the C region or the D region. In this case, the rotation of the wire reel 4 is detected (Step 123).

If the above is summarized, as for the range in which rotation can be detected, as shown in FIG. 23, two patterns and four kinds of rotation detection aspects are obtained when the photosensor 26 detects light before the contact sensor 32, and one pattern and two kinds of rotation detection aspects are obtained when the contact sensor 32 detects light before the photosensor 26.

As such, although all the rotational amount of the wire reels which is mounted on the binding machine body cannot be detected, the rotational frequency of the wire reel 4 can be detected when the rotation start position and rotation stop position shown in FIG. 23 have been read. If the rotational frequency of the wire reel 4 at the last stage of rotation can be detected, the feed amount of the wire can be converted from this rotational amount.

According to the above transmissive sensor 26, detection of the rotational amount of the wire reel 4 can be detected at a pitch of 40°. Since the signal interval is 40°, the ranges where rotation cannot be detected immediately after start of rotation of the wire reel 4 and immediately before stop of rotation thereof are respectively 40°. Therefore, the error of rotation detection of 80° at the maximum per 1 binding occurs. As for this error, the detection error of the wire feed amount becomes about 24 mm at the last stage of rotation of the wire reel 4. In contrast, the case where the wire feed amount is insufficient and poor binding occurs is the case where the feed amount runs short of 40 mm or more. Accordingly, if there is this level of resolution, the feed decrease amount of 40 mm can be detected, and correction of the feed amount can be sufficiently performed.

That is, although the wire feed amount is measured by the rotation of the feed motor 16*a*, since the feed gears 8 are worn during their repeated use, a predetermined amount of feed cannot necessarily be secured. Thus, as shown in FIG. 11, the control circuit compares the feed amount of the wire 5 obtained by the rotation of the feed motor 16*a* which constitutes the wire feeding device with the feed amount of the wire 5 converted from the rotational amount of the wire reel 4, and increases the rotational frequency of the feed motor 16*a* and compensates a feed insufficiency when it is determined that the feed amount by the feed gears 8 is insufficient. By such processing, the feed of a wire is checked double, and a good binding state can always be maintained.

Next, when the type of a wire is determined, two kinds of wires can be determined according to whether the transmission hole 64 is detected or not detected by providing the second information detection region S2 with the wire reel 4 in which one transmission hole 64 is formed, and the wire reel 4 in which no transmission hole 64 is formed, as the shown form. In addition, whether or not a region is the second information detection region S2 can be identified according to whether there are two or more signals by the transmission holes 64 between signals output by two projections. When the type of a wire are determined, the control circuit instantaneously sets torsion torque by the feed amount of the wire 5 according to the rotational frequency (rotational angle) of the wire feed gears 8 or supply power of the electric motor 16*b* according to the kind of the wire.

As described above, the side wall inside the hub portion of the wire reel 4 is used as an information detection region, and this information detection region is provided with a plurality of transmission holes which allows the light from the transmissive photosensor provided in the binding machine body to be transmitted therethrough. Therefore, rotational information having different meanings, such as information as a measure which detects the rotational amount of the reel according to the array of the transmission holes, and information for identifying the type of a reel can be given only by rotating the wire reel 4.

Figure 24:
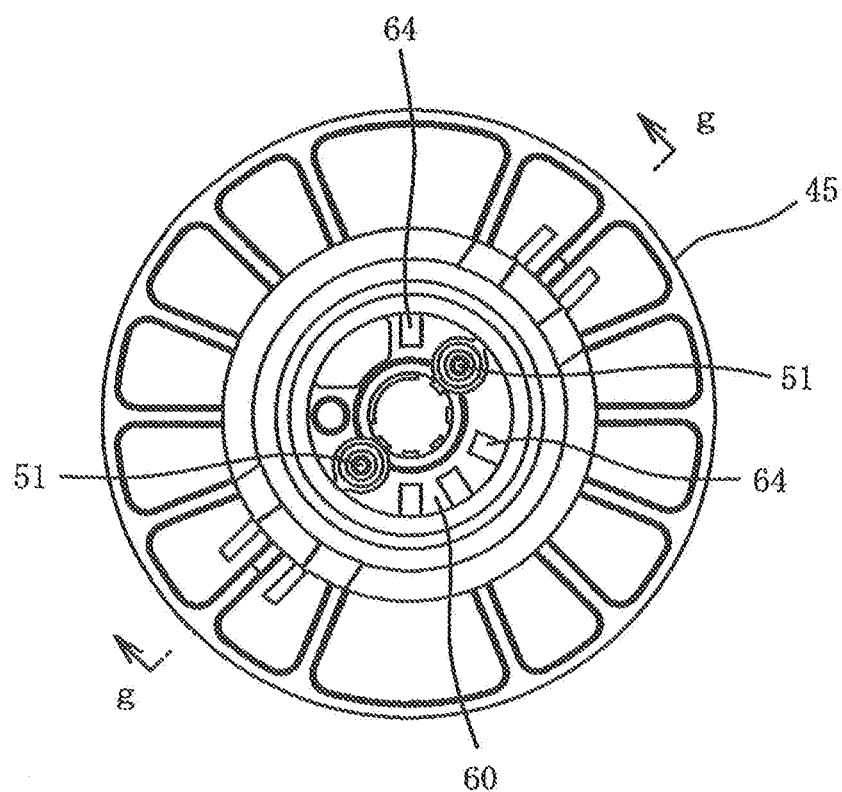
FIG. 24 is a side view of the form of another wire reel.
Figure 25:
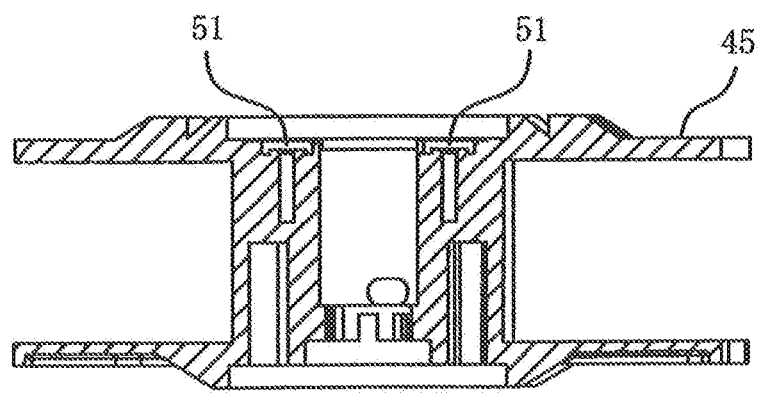
FIG. 25 is a sectional view on a line g-g of FIG. 22.

In addition, the sensor which sends a reference signal which detects the rotational amount of the wire reel 4 is not limited to the above mechanical sensor. For example, as shown in FIGS. 24 and 25, a pair of white marks 51 and 51 may be provided on a side surface 68 of the side wall 60 on the side of the flange 45 so as to correspond to the projections 41 and 42 shown in FIG. 10, and these marks may be detected by the reflective photosensor 26 provided in the circular protrusion 25 on the side of the binding machine body 2.

Additionally, the number of the transmission holes 64 in the first information detection region S1 is not limited to the above-described form. If one transmission hole is increased, the reading frequency of the start position of rotation can be further increased, and the type of three or more kinds of wires can also be determined.

Additionally, the information detection region is also not limited to a form in which the region is split into half circumferences. For example, a rotational frequency information detection region where the rotational frequency of the wire reel 4 is detected may be set to 120°, and a type information detection region where the type of a wire is determined may be set to 60°. The information detection regions may be suitably determined according to the number of rotation information and resolution.

Figure 26:
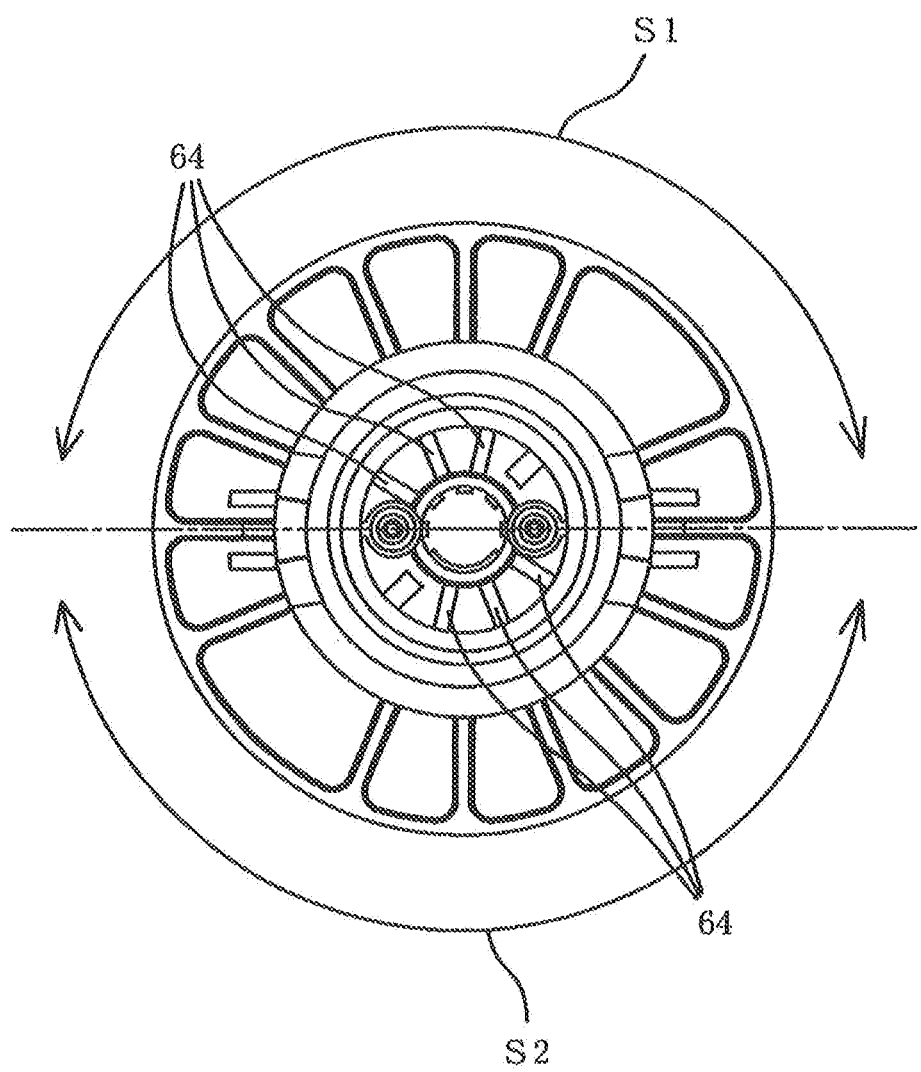
FIG. 26 is a side view of a wire reel in which the same number of light-transmitting portions are provided in different information detection regions.

Moreover, it is not necessary to form transmissions holes having mutually different numbers in the respective detection regions. As shown in FIG. 26, the transmission holes 64 of the information detection region S1 for detection of rotational amount, and the transmission holes 64 of the information detection region S2 for determination of reel type may be formed by the same number. In this case, if the number of detection of rotational amount is determined, the other becomes type information.

Similarly, the information detection region is also not limited to a form in which the region is split into two. Since the information detection region may be provided according to the kind of required information, the region may be split into three or more information regions.

Figure 27A:
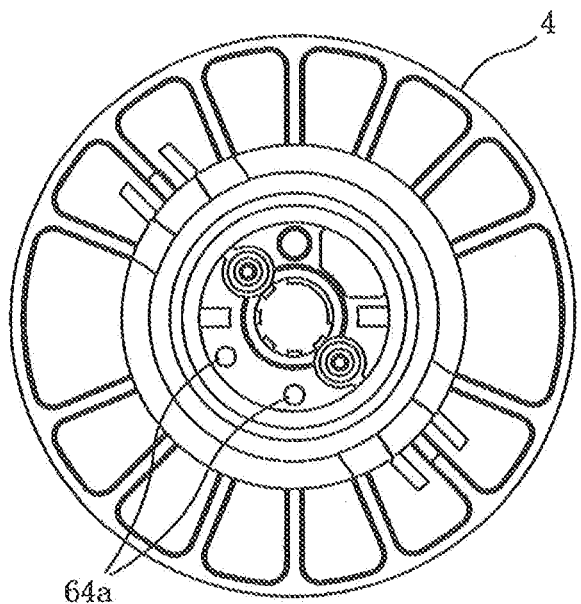
FIGS. 27(a) and 27(b) are side views of the wire reel showing a form including a circular light-transmitting portion.
Figure 27B:
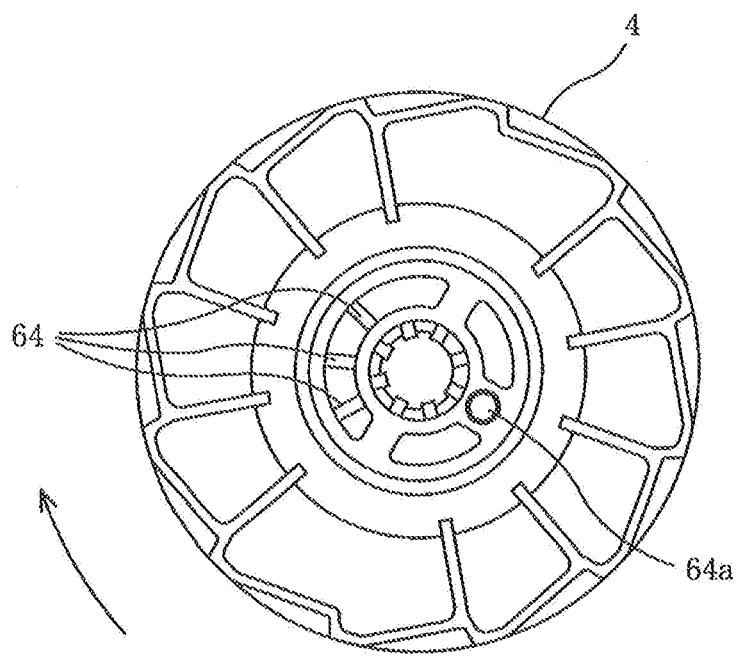

In addition, the transmission holes are not limited to being slit-like. For example, as shown in FIG. 27(*a*), the transmission boles may be circular transmission holes 64*a*, or square transmission holes. In a case where the type of wires is only two or three, for distinguishing these, high resolution is not necessarily required in determining the type of wires. In such a case, circular or rectangular transmission holes may be used. Additionally, as shown in FIG. 27(*b*), circular transmission holes 64 and slit-like transmission holes 64 may be combined together.

Figure 29A:
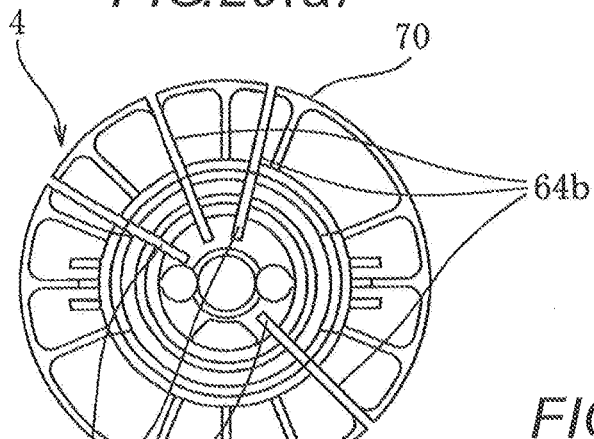
FIGS. 29(a), 29(b), and 29(c) are respectively a side view showing another form of the light-transmitting portion of the wire reel, an enlarged view thereof, and a sectional view on a line h-h.
Figure 29B:
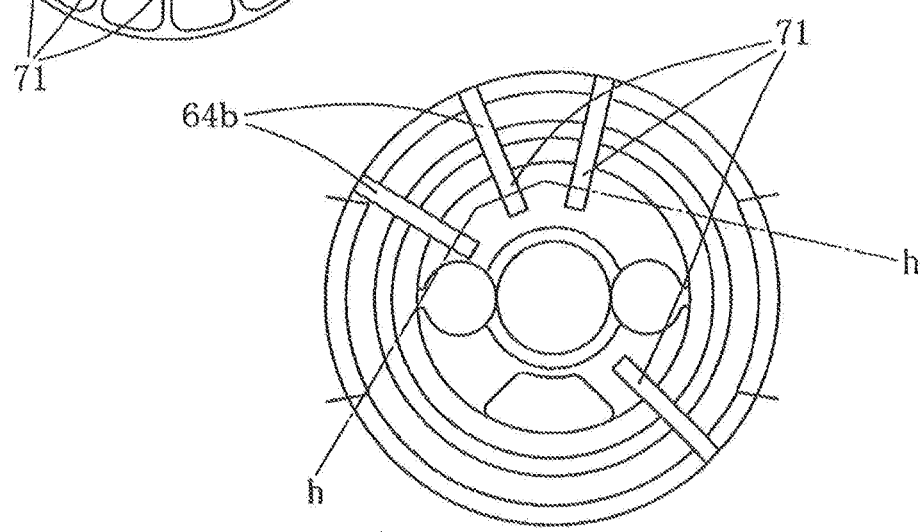
Figure 29C:
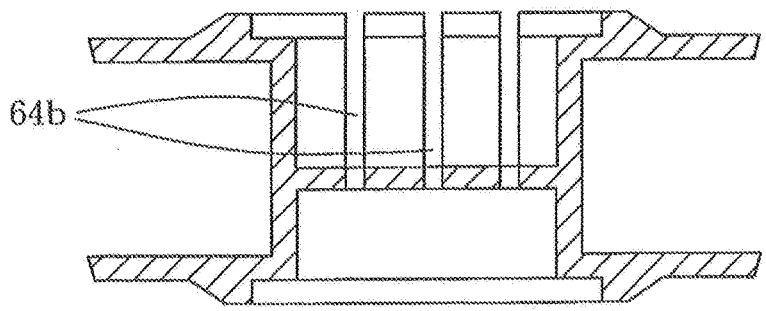

In addition, although the light-transmitting portions has been described as transmission holes which allow light to be transmitted therethrough in the above-described embodiments, the light-transmitting portions are not limited to holes. Additionally, it is not necessary to form the light-transmitting portions so as to be limited to portions which transmit light from the light-emitting element 27 to the light-receiving element 28. For example, as shown in FIGS. 29(*a*), 29(*b*) and 29(*c*), a light-transmitting portion 64*b* may be formed so as to extend toward the outer peripheral edge of the wire reel 4 from a transmission portion 71 through which light is transmitted from a light-emitting element to a light-receiving element. In this case, like these drawings, the end of the light-transmitting portion 64*b* may be formed so as to be opened to an outer peripheral edge 70 of one flange of the wire reel 4. Additionally, the transmission portion may not be formed straight. The transmission portion may be curved.

Figure 30A:
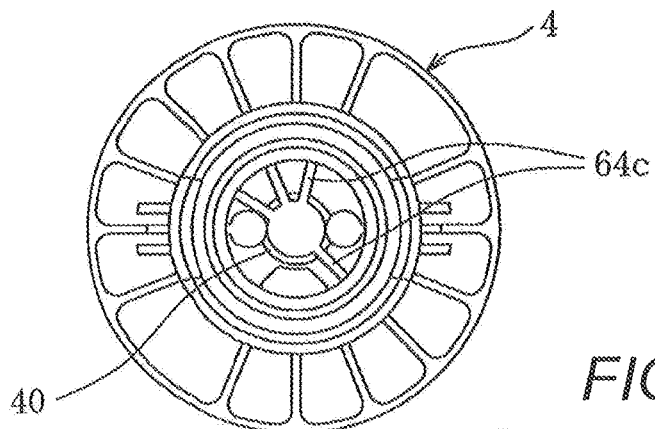
FIGS. 30(a), 30(b), and 30(c) are respectively a side view showing still another form of the light-transmitting portion of the wire reel, an enlarged view thereof, and a sectional view on a line i-i.
Figure 30B:
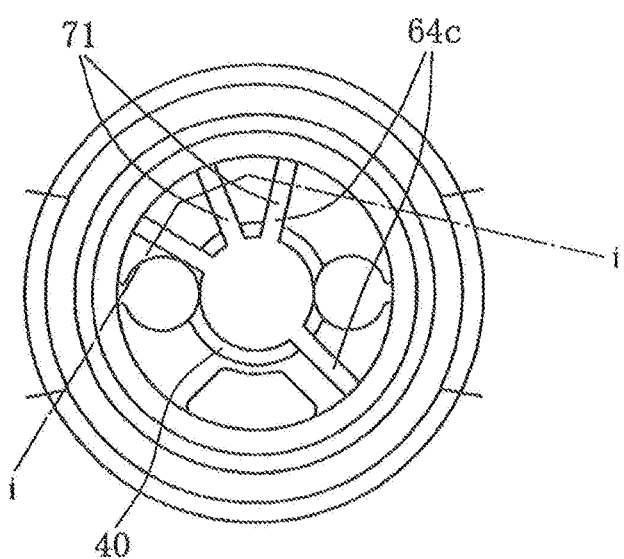
Figure 30C:
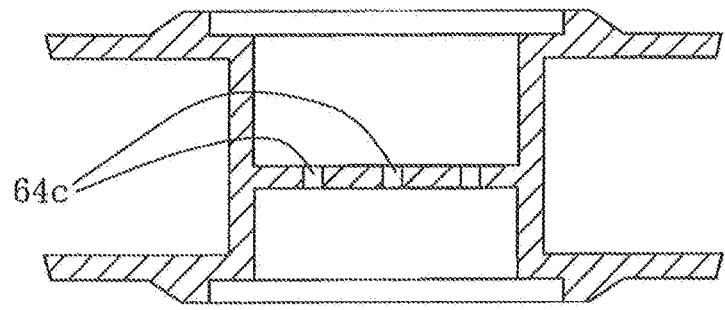

Similarly, as shown in FIGS. 30(a), 30(b), and 30(c), a light-transmitting portion 64c may be formed so as to extend toward the center of the wire reel 4. In this case, like these drawings, the end of the light-transmitting portion 64c may be formed so as to be opened to the inner tube 40 of the wire reel 4, or may be curved.

Figure 31A:
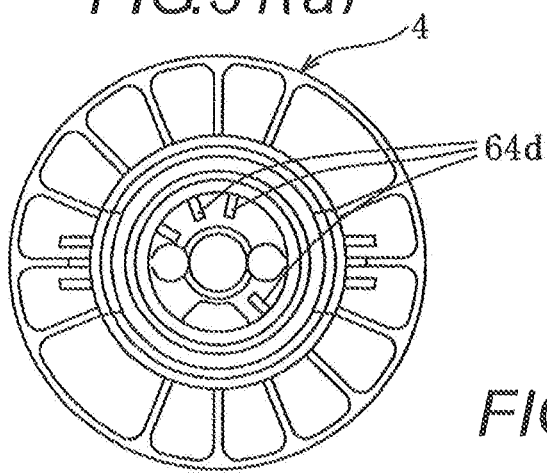
FIGS. 31(a), 31(b), and 31(c) are respectively a side view shoving a still further form of the light-transmitting portion of the wire reel, an enlarged view thereof, and a sectional view on a line j-j.
Figure 31B:
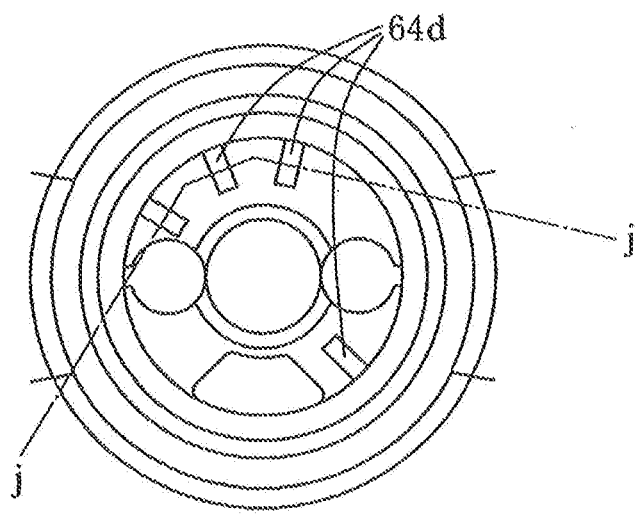
Figure 31C:
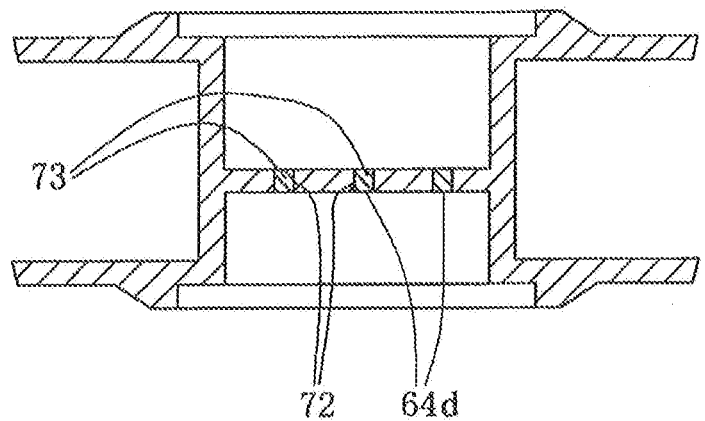

Additionally, the respective light-transmitting portions 64d, as shown in FIG. 31, may have a configuration in which an opening 72 formed in the wire reel 4 is plugged up by a light-transmitting material 73.

Figure 32:
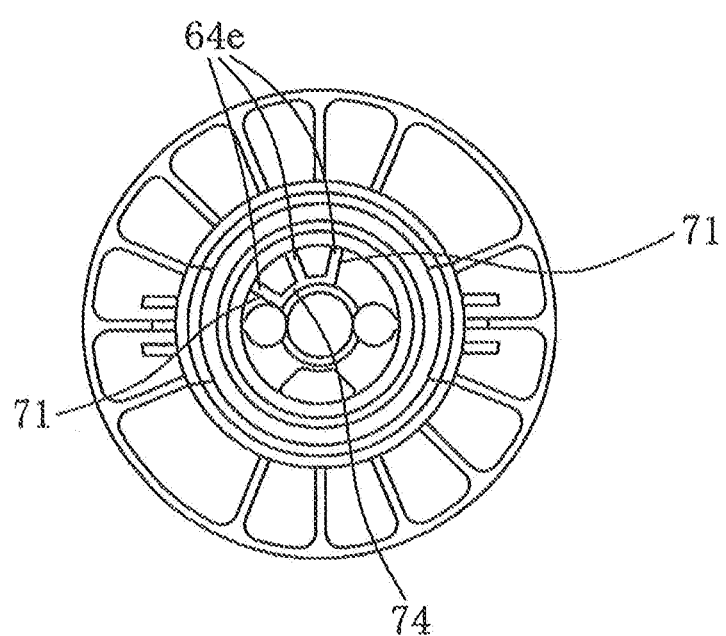
FIG. 32 is an enlarged view of a still further form of the light-transmitting portion of the wire reel.

Additionally, the number of light-transmitting portions is the number of portions through which light is transmitted from a light-emitting element toward a light-receiving element. As shown in FIG. 32, even if three light-transmitting portion 64e are connected via connecting portions 74 in the portions excluding portions 71 through which light is transmitted from the light-emitting element toward the light-receiving element so that they are apparently seen as one, the light-transmitting portions are not one but three.

While description has been made in connection with specific exemplary embodiment of the intention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A wire reel which is mountable to a reinforcing bar binding machine, the wire reel comprising:
   a hub portion;
   an inner tube formed coaxially with the hub portion inside of the hub portion;
   first and second flanges extending radially outwardly from the hub portion, wherein the first and second flanges are spaced in an axial direction such that, with respect to the axial direction, the first flange is on a first side of the wire reel and the second flange is on a second side of the wire reel;
   a side wall extending between the hub portion and the inner tube;
   four light transmitting portions are positioned radially in the side wall, wherein a light passes through the wire reel from the first side, through each light transmitting portion, and to the second side; and
   a first half circumference portion and a second half circumference portion on the side wall, wherein the first half circumference portion has three light transmitting portions and the second half circumference portion has one light transmitting portion,
   wherein an interval between one light transmitting portion in the first half circumferential portion and one adjacent light transmitting portion in the first half circumferential portion is different from an interval between the one light transmitting portion and another adjacent light transmitting portion in the second half circumferential portion.

2. The wire reel according to claim 1, further comprising:
   a pair of projections formed on the first side, wherein the projections face each other across the hub portion,
   wherein the side wall is divided by a line which connects the pair of the projections, to divide the first half circumferential portion from the second half circumferential portion.

\* \* \* \* \*